(12) United States Patent
Ghiasi et al.

(10) Patent No.: US 7,349,450 B2
(45) Date of Patent: Mar. 25, 2008

(54) MULTI-STAGE HIGH SPEED BIT STREAM DEMULTIPLEXER CHIP SET HAVING SWITCHABLE MASTER/SLAVE RELATIONSHIP

(75) Inventors: Ali Ghiasi, Cupertino, CA (US); Mohammad Nejad, Newport Beach, CA (US); Rajagopal Anantha Rao, Fullerton, CA (US)

(73) Assignee: Broadcom Corporation, Irvine, CA (US)

( * ) Notice: Subject to any disclaimer, the term of this patent is extended or adjusted under 35 U.S.C. 154(b) by 981 days.

(21) Appl. No.: 10/602,226

(22) Filed: Jun. 24, 2003

(65) Prior Publication Data

US 2004/0028086 A1     Feb. 12, 2004

Related U.S. Application Data

(60) Provisional application No. 60/403,457, filed on Aug. 12, 2002.

(51) Int. Cl.
*H04J 3/22* (2006.01)
(52) U.S. Cl. .................................. 370/543
(58) Field of Classification Search ............... 370/536, 370/542–545
See application file for complete search history.

(56) References Cited

U.S. PATENT DOCUMENTS

| | | | | |
|---|---|---|---|---|
| 3,497,627 A | * | 2/1970 | Blasbalg et al. | 370/544 |
| 3,909,541 A | * | 9/1975 | Bobilin | 370/505 |
| 5,067,126 A | * | 11/1991 | Moore | 370/544 |
| 5,838,680 A | * | 11/1998 | Noiri et al. | 370/395.7 |
| 6,657,953 B1 | * | 12/2003 | Hiramoto et al. | 370/224 |
| 6,667,519 B2 | * | 12/2003 | Farwell et al. | 257/369 |
| 6,674,772 B1 | * | 1/2004 | Dally et al. | 370/539 |
| 7,039,067 B2 | * | 5/2006 | Feinberg et al. | 370/468 |

* cited by examiner

*Primary Examiner*—Doris H. To
*Assistant Examiner*—Kerri M Rose
(74) *Attorney, Agent, or Firm*—Garlick Harrison & Markison; Bruce E. Garlick; Kevin L. Smith

(57) ABSTRACT

A bit stream demultiplexer that couples a high-speed bit stream media to a communication Application Specific Integrated Circuit (ASIC). The bit stream multiplexer performs its demultiplexing function staged within at least two integrated circuits. The first Integrated Circuit (IC) receives a first bit stream and performs a first demultiplexing function. A second IC performs a second demultiplexing function. The second IC acts as either a slave or a master to the first IC. In a slave mode, the second IC depends upon a transmit data clock from the first IC for latching bit stream data received from the first IC. When the second IC operates in the master mode, the second IC uses the transmit data clock from first IC as a reference input for a PLL to generate a Receive Data Clock. If an LOL or LOS occurs within the first IC, a signal to the second IC indicates these conditions causing the second IC to switch to a local oscillator reference clock to generate the Receive Data Clock.

63 Claims, 15 Drawing Sheets

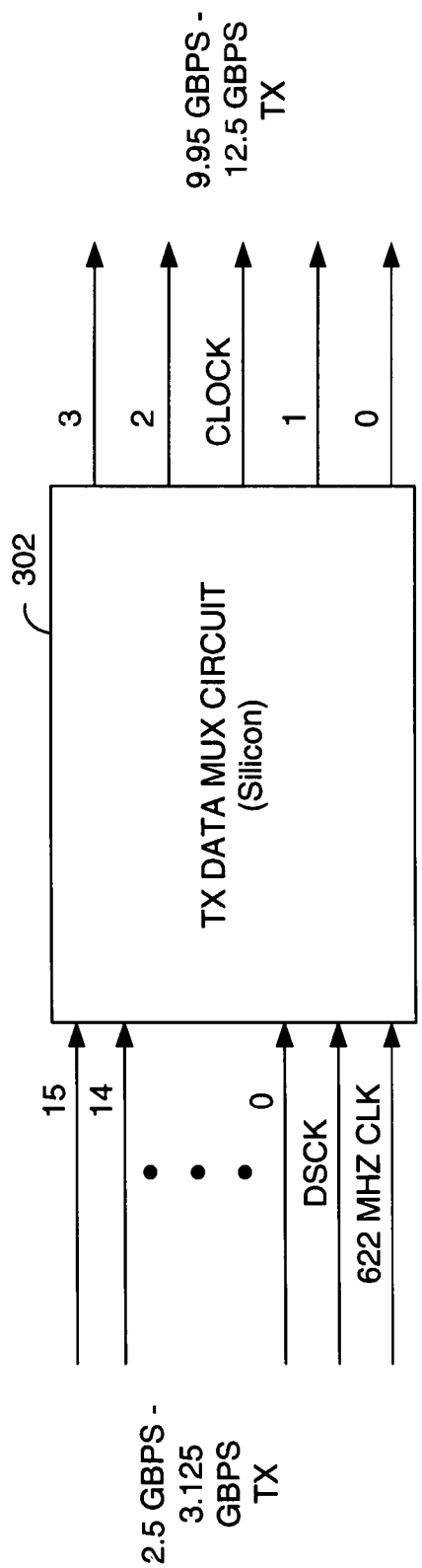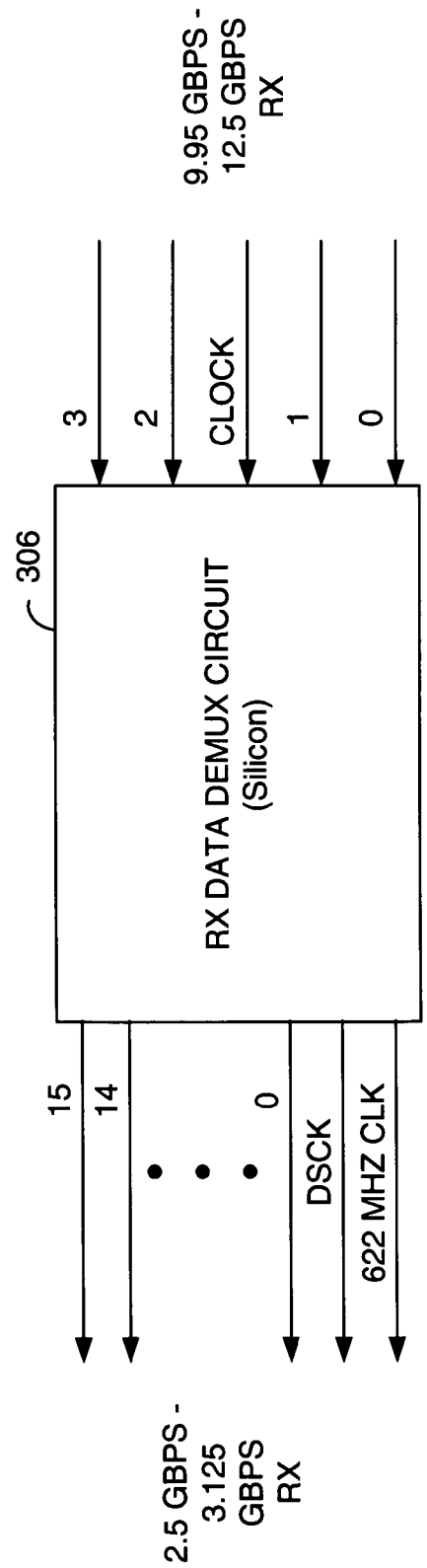

Receiver Input and Source Centered Clock Performance

| Parameter | Symbol | Conditions | Min | Typ | Max | Units |
|---|---|---|---|---|---|---|
| Output Common Mode | Vcm | See Figure Below | 1575 | 1675 | 1775 | mV |
| Single Ended Output Impedance | $Z_{SE}$ | | 40 | 50 | 60 | Ω |
| Differential Input impedance | $Z_d$ | | 80 | 100 | 120 | Ω |
| Input Impedance Mismatch | $Z_M$ | | | | 10 | % |
| Q40, CML Input Differential Amplitude, p-p | Δ VQDO | See Figure Below | 400 | 500 | 600 | mV |
| Q40 Input Rise and Fall Time (20% to 80%) | $t_{RH}, t_{FH}$ | | | 25 | 35 | ps |
| Differential output return loss* | S11 | Up to 7.5 GHz | | | | dB |
| 4-by-1 mux input return loss >15 db at 10 GHz | | | | | | |

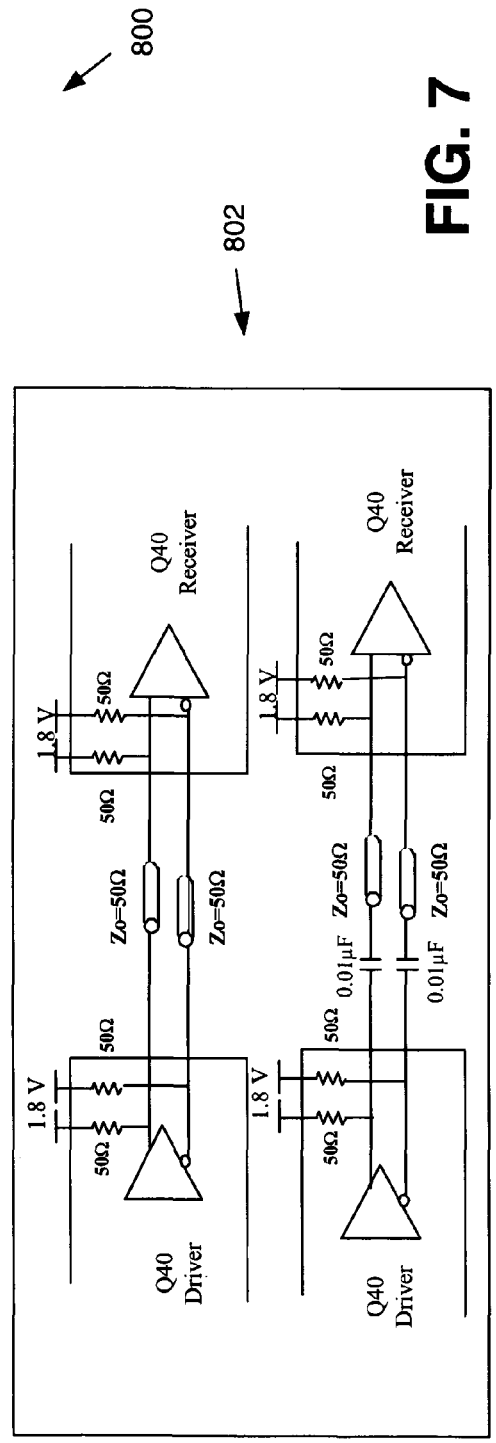

FIG. 7

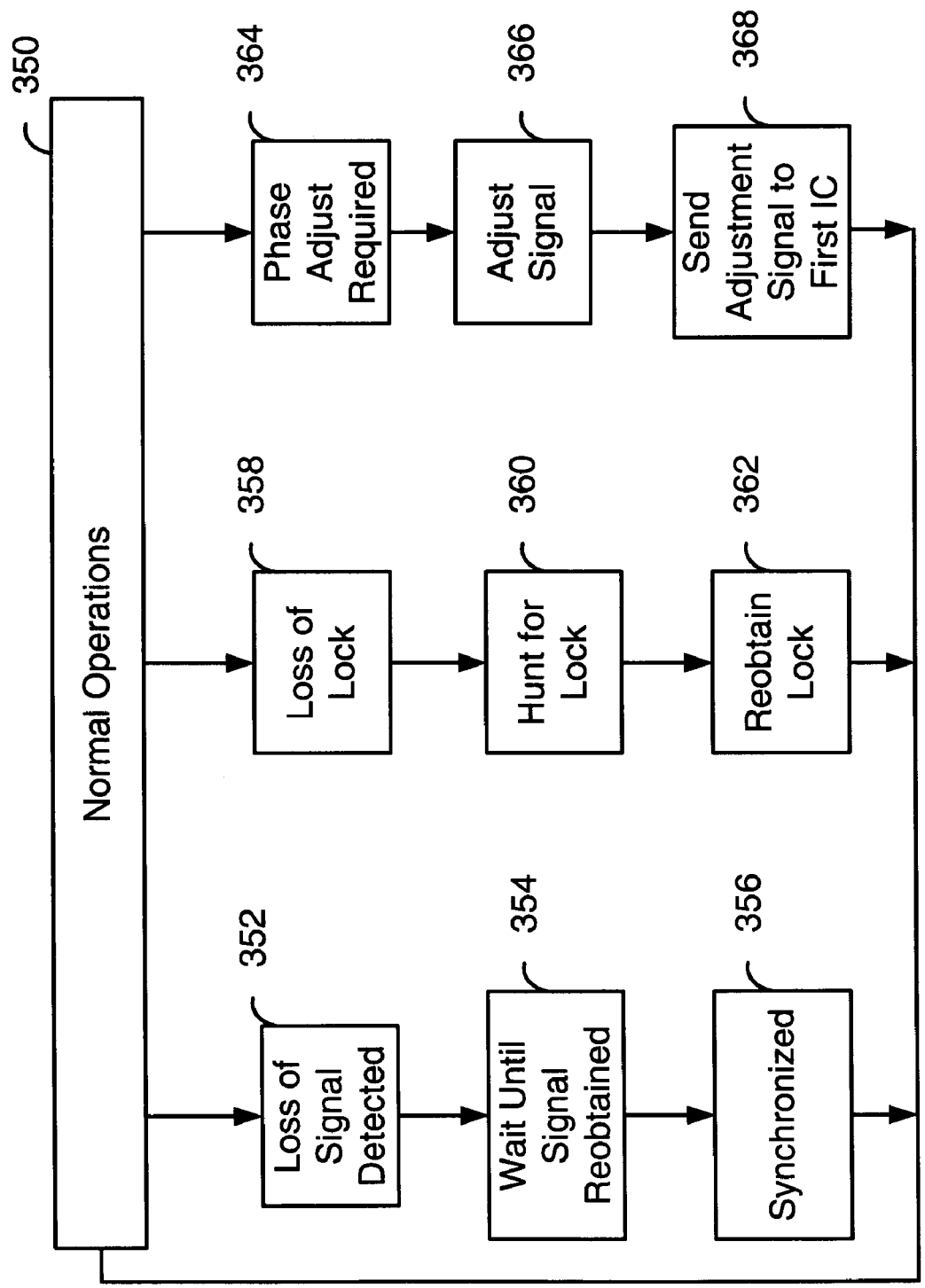

MULTI-STAGE HIGH SPEED BIT STREAM DEMULTIPLEXER CHIP SET HAVING SWITCHABLE MASTER/SLAVE RELATIONSHIP

CROSS REFERENCE TO RELATED APPLICATION

This application claims priority to U.S. Provisional Application Ser. No. 60/403,457, filed Aug. 12, 2002, which is incorporated herein by reference in its entirety for all purposes.

BACKGROUND OF THE INVENTION

1. Technical Field of the Invention

The present invention relates generally to communication systems; and more particularly to high-speed serial bit stream demultiplexing.

2. Description of Related Art

The structure and operation of communication systems is generally well known. Communication systems support the transfer of information from one location to another location. Early examples of communication systems included the telegraph and the public switch telephone network (PSTN). When initially constructed, the PSTN was a circuit switched network that supported only analog voice communications. As the PSTN advanced in its structure and operation, it supported digital communications. The Internet is a more recently developed communication system that supports digital communications. As contrasted to the PSTN, the Internet is a packet switch network.

The Internet consists of a plurality of switch hubs and digital communication lines that interconnect the switch hubs. Many of the digital communication lines of the Internet are serviced via fiber optic cables (media). Fiber optic media supports high-speed communications and provides substantial bandwidth, as compared to copper media. At the switch hubs, switching equipment is used to switch data communications between digital communication lines. WANs, Internet service providers (ISPs), and various other networks access the Internet at these switch hubs. This structure is not unique to the Internet, however. Portions of the PSTN, wireless cellular network infrastructure, Wide Area Networks (WANs), and other communication systems also employ this same structure.

The switch hubs employ switches to route incoming traffic and outgoing traffic. A typical switch located at a switch hub includes a housing having a plurality of slots that are designed to receive Printed Circuit Boards (PCBs) upon which integrated circuits and various media connectors are mounted. The PCBs removably mount within the racks of the housing and typically communicate with one another via a back plane of the housing. Each PCB typically includes at least two media connectors that couple the PCB to a pair of optical cables and/or copper media. The optical and/or copper media serves to couple the PCB to other PCBs located in the same geographic area or to other PCBs located at another geographic area.

For example, a switch that services a building in a large city couples via fiber media to switches mounted in other buildings within the city and switches located in other cities and even in other countries. Typically, Application Specific Integrated Circuits (ASICs) are mounted upon the PCBs of the housing. These ASICs perform switching operations for the data that is received on the coupled media and transmitted on the coupled media. The coupled media typically terminates in a receptacle and transceiving circuitry coupled thereto performs signal conversion operations. In most installations, the media, e.g., optical media, operates in a simplex fashion. In such case, one optical media carries incoming data (RX data) to the PCB while another optical media carries outgoing data (TX data) from the PCB. Thus, the transceiving circuitry typically includes incoming circuitry and outgoing circuitry, each of which couples to a media connector on a first side and communicatively couples to the ASIC on a second side. The ASIC may also couple to a back plane interface that allows the ASIC to communicate with other ASICs located in the enclosure via a back plane connection. The ASIC is designed and implemented to provide desired switching operations. The operation of such enclosures and the PCBs mounted therein is generally known.

The conversion of information from the optical media or copper media to a signal that may be received by the ASIC and vice versa requires satisfaction of a number of requirements. First, the coupled physical media has particular RX signal requirements and TX signal requirements. These requirements must be met at the boundary of the connector to the physical media. Further, the ASIC has its own unique RX and TX signal requirements. These requirements must be met at the ASIC interface. Thus, the transceiving circuit that resides between the physical media and the ASIC must satisfy all of these requirements.

Various standardized interfaces have been employed to couple the transceiving circuit to the ASIC. These standardized interfaces include the XAUI interface, the Xenpak interface, the GBIC interface, the XGMII interface, and the SFI-5 interface, among others. The SFI-5 interface, for example, includes 16 data lines, each of which supports a serial bit stream having a nominal bit rate of 2.5 Giga bits-per-second (GBPS). Line interfaces also have their own operational characteristics. Particular high-speed line interfaces are the OC-768 interface and the SEL-768 interface. Each of these interfaces provides a high-speed serial interface operating at a nominal bit rate of 40 GBPS.

Particular difficulties arise in converting data between the 40×1 GBPS line interface and the 16×2.5 GBPS communication ASIC interface. In particular, operation on the 40 GBPS side requires the ability to switch data at a very high bit rate, e.g., exceeding the bit rate possible with a CMOS integrated circuit formed of Silicon. While other materials, e.g., Indium-Phosphate and Silicon-Germanium provide higher switching rates than do Silicon based devices, they are very expensive and difficult to manufacture. Further, the functional requirements of interfacing the 40×1 GBPS line interface and the 16×2.5 GBPS communication ASIC interface are substantial. Thus, even if a device were manufactured that could perform such interfacing operations, the effective yield in an Indium-Phosphate or Silicon-Germanium process would be very low.

When multiple chips are assembled to provide an end-to-end solution in a high speed serial communications system such as the one described above, a decision has to be made as to the source for the clock that latches the data into the downstream circuit (i.e. the data receiving the data. One choice is to have the downstream circuit generate its own clock for latching the data. While this choice permits the upstream circuit to be simpler, there also can be problems associated with generating the clock on the chip that is receiving the data, such as jitter and phase alignment issues. Generating the clock at the upstream circuit may provide a cleaner clock that is more related to the data, but it also serves to render the upstream more complex.

Thus, there is a need in the art for a low cost and high speed interface that couples a high-speed line side interface to a communication ASIC.

BRIEF SUMMARY OF THE INVENTION

The bit stream demultiplexer of the present invention couples a high-speed bit stream media to a communication Application. Specific Integrate Circuit (ASIC). One embodiment provides a bit stream demultiplexer having a switchable master slave relationship between an upstream demultiplexing integrated circuit that receives an input signal and outputs a number of first bit streams at a first bit rate, and a downstream demultiplexing integrated circuit that receives the first bit streams and outputs a greater number of second bit streams at a second lower bit rate. The upstream and downstream demultiplexing integrated circuits may be formed on any combination of InP, SiGe, GaN, GaAs, or Si substrates.

A clock circuit generates a clock signal for the upstream demultiplexing circuit based upon a reference clock signal when the downstream demultiplexing circuit operates in a master mode. Similarly, the clock circuit generates the clock signal based upon an external clock signal received from the upstream demultiplexing circuit when the downstream demultiplexing circuit operates in a slave mode. In either case, an external clock signal supplied to the downstream demultiplexing integrated circuit may be generated by a crystal oscillator or other like device.

An input selector may be used to specify the mode of operation of the downstream demultiplexing integrated circuit. The clock circuit may further include a Phased Locked Loop (PLL). The PLL within the downstream demultiplexing circuit may receive a first reference clock from the external clock signal generated by the upstream demultiplexing circuit. A second reference clock provides the second reference clock signal to the PLL. The PLL then produces a PLL Data Clock based on either the first or second reference clock depending on the downstream demultiplexing circuit's mode of operation. When operating in master mode, the clock circuit can generate the Receive Data Clock based on the second reference clock input when a Loss Of Signal (LOS) indication is received. The LOS indication occurs when the input signal has stopped and is provided by the upstream demultiplexing circuit.

Additionally, the clock circuit may use the PLL to monitor frequency deviation between the first reference clock input and the second reference clock input to produce a phase adjustment signal to compensate for frequency deviation exceeding a predetermined amount. The external clock signal generated by the upstream demultiplexing circuit may be based on a clock recovered from the input signal. This eliminates the need to input a separate clock signal. The PLL Data Clock may (in some configurations) be bypassed to provide a Receive Data Clock based on the external clock signal when a master/slave mode select input forces the second demultiplexing integrated circuit to operate in a slave mode.

The present invention also provides a method of coupling high-speed bit stream input signals to a multistage demultiplexing integrated circuit. The first stage receives an input signal, which is demultiplexed into a number of first bit streams at a first bit rate. This set of first bit streams are demultiplexed by a second stage demultiplexing circuit to produce a second set of bit streams at a second bit rate, wherein the first bit rate is greater than the second bit rate. A clock signal for the second stage demultiplexer, based upon a reference clock when the second stage demultiplexing integrated circuit operates in a master mode, or an external clock signal received from the first stage when the second stage ioperates in a slave mode, allows the second stage to properly latch data from the first set of bit streams. The second stage may be directed to operate in either a master or slave mode with respect to the first stage by an input selector.

A PLL within the clock circuit that is associated with the second stage receives a first reference clock generated by the first stage demultiplexing integrated circuit and a second reference clock that is generated by the second stage. These references allow the PLL to generate a PLL Data Clock, based on either the first or second reference clocks depending upon the mode of operation of the second stage. The PLL Data Clock is used to produce a Receive Data Clock used within the second stage demultiplexing circuit to properly latch data from the first bit streams.

To prevent abnormal operations, the Receive Data Clock generates from the second reference clock when a Loss Of Signal indication is received from the first stage. Similarly, the frequency deviation between the first reference and second reference may be monitored to produce a phase adjustment signal which the first stage uses to compensate for frequency deviations.

In another embodiment, a media interface produces a single bit stream at a line bit rate from a high-speed bit stream media. A first demultiplexing circuit that receives the bit stream at a line bit rate, produces a first set of bit streams at a first bit rate. A second demultiplexing circuit receives the first set of bit streams and produces a second set of bit streams at a second, lower bit rate. The second demultiplexing circuit may operate in a master or slave mode relative to the first demultiplexing circuit. The mode of operation may, in some configurations, depend on the state of a master/slave select input to the second demultiplexing circuit or logical decisions based on other inputs.

The second demultiplexing circuit includes a PLL that receives a first reference clock from the first demultiplexing circuit, and a second reference clock generated by the second demultiplexing circuit. The PLL produces an output PLL Data Clock based on either the first or second reference clocks inputs, the selection of one of these based upon logic selections that specify which circuit acts as the master. The PLL Data Clock provides a Receive Data Clock to latch data from the first bit streams. By default, the PLL generates the Receive Data Clock based on the second reference clock when the second demultiplexing circuit receives an LOS indication.

The PLL may also monitor frequency deviation between the first reference clock and the second reference clock to produce a phase adjustment signal for the first demultiplexing circuit to compensate for frequency deviation. A LOS indication outputs from the first demultiplexing circuit to the second demultiplexing circuit to indicate that the bit stream input has been interrupted. The first demultiplexing circuit may generate a Transmit Data Clock or first reference clock based on a clock recovered from the input bit stream. This increases circuit response by latching data on a signal derived from the input signal. The transmit data clock may also be generated from an internal reference clock.

Yet another embodiment demultiplexes high-speed bit streams from high bit rate stream inputs into a first set of bit streams at a first, lower, bit rate. Demultiplexing a bit stream may further include generating a transmit data clock having a frequency that is one-half of the second bit rate and source centered with respect to the data of the second set of bit streams.

The method demultiplexes the first set of bit streams using a second circuit to produce a second set of bit streams at a second, even lower, bit rate. A Receive Data Clock, generated within the second circuit, allows data to-be latched from the first set of bit streams. The second set of bit streams are then communicated to an ASIC. The method derives the Receive Data Clock from a PLL Data Clock when a master/slave mode select input is in master mode and directly from the transmit data clock when the master/slave mode select input is in slave mode.

In another embodiment, the PLL Data Clock may generate based on selecting an oscillator clock as a reference for the PLL Data Clock. Other features and advantages of the present invention will become apparent from the following detailed description of the invention made with reference to the accompanying drawings.

BRIEF DESCRIPTION OF THE SEVERAL VIEWS OF THE DRAWINGS

These and other features, aspects and advantages of the present invention will be more fully understood when considered with respect to the following detailed description, appended claims and accompanying drawings wherein:

FIG. 4A is a block diagram illustrating a TX data multiplexer circuit constructed according to the present invention;

FIG. 4B is a block diagram illustrating an RX data demultiplexer circuit constructed according to the present invention;

FIG. 7 is a table and a diagram that illustrate operating specifications for the RX interface between the RX data demultiplexer circuits of FIG. 3;

FIG. 13 shows the processes that occur when a deviation from normal operations has occurred;

DETAILED DESCRIPTION OF THE INVENTION

Figure 1:
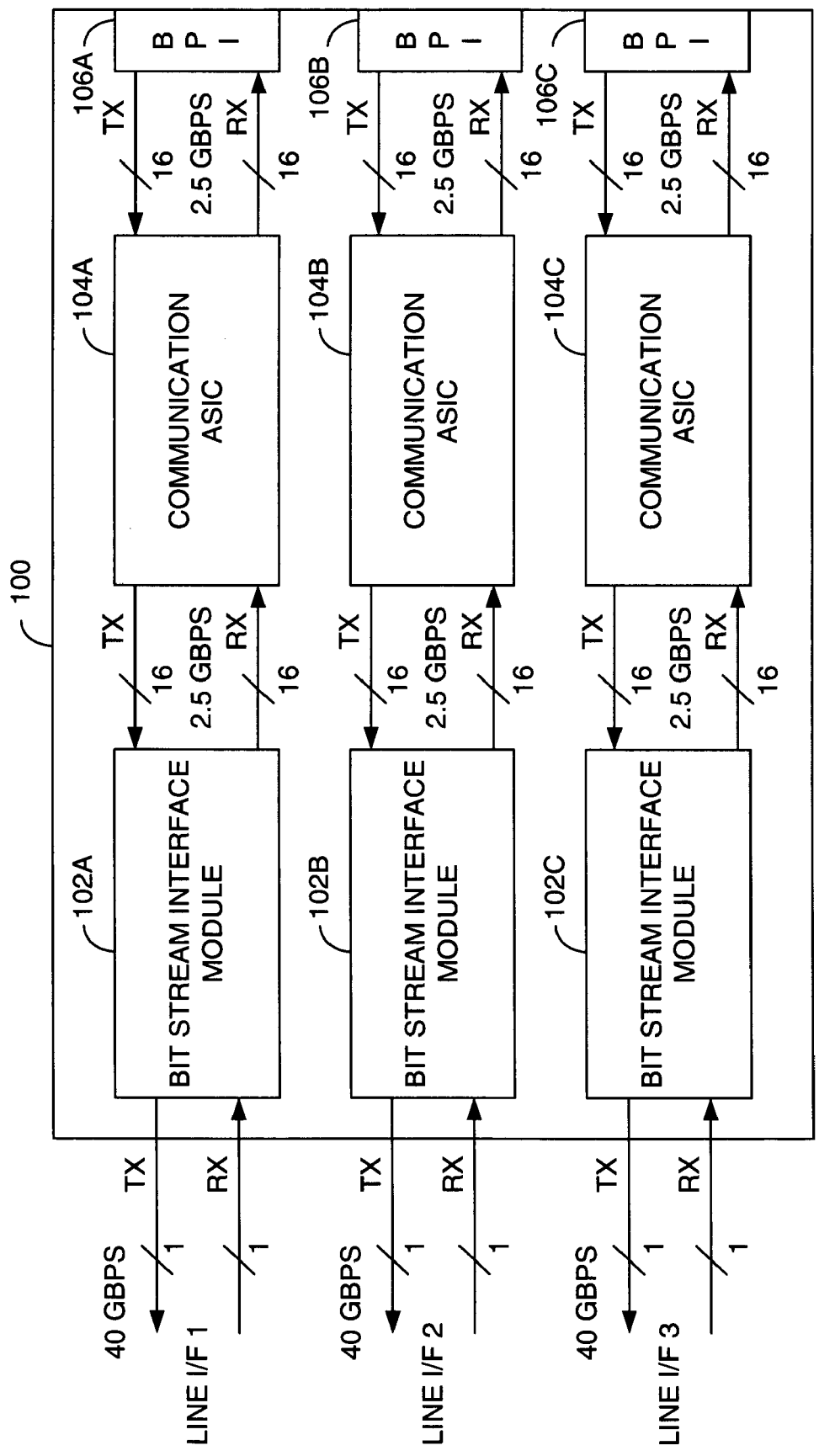
FIG. 1 is a block diagram illustrating a Printed Circuit Board (PCB) that has mounted thereon a plurality of Bit Stream Interface Module (BSIMs) constructed according to the present invention.

FIG. 1 provides a block diagram depicting a Printed Circuit Board (PCB) that has mounted thereon a plurality of Bit Stream Interface Module (BSIMs). As shown in FIG. 1, the PCB 100 includes BSIMs 102A, 102B and 102C. The PCB 100 also includes mounted thereupon communication Application Specific Integrated Circuits (ASIC) 104A, 104B, and 104C. The PCB 100 is mounted within a housing that services switching requirements within a particular location or geographic area. Each of the BSIMs 102A, 102B, and 102C couples to a high-speed media such as an optical fiber or other media as known to those skilled in the art, via a respective media interface and supports the OC-768 or the SEC-768 standard at such media interface. On the second side of the BSIMs 102A through 102C, the SFI-5 interface standard is supported. Communication ASIC 104A through 104C may communicate with other PCB components located in the housing via back interfaces 106A through 106C.

The BSIMs 102A through 102C may be removably mounted upon the PCB 100. In such case, if one of the BSIMs 102A through 102C fails it may be removed and replaced without disrupting operation of other devices on the PCB 100. When the BSIMs 102A-102C are removably mounted upon the PCB 100, they are received by a socket or connection coupled to the PCB 100. Further, in such embodiment, the BSIMs 102A-102C may be constructed on a separate PCB.

Figure 2A:
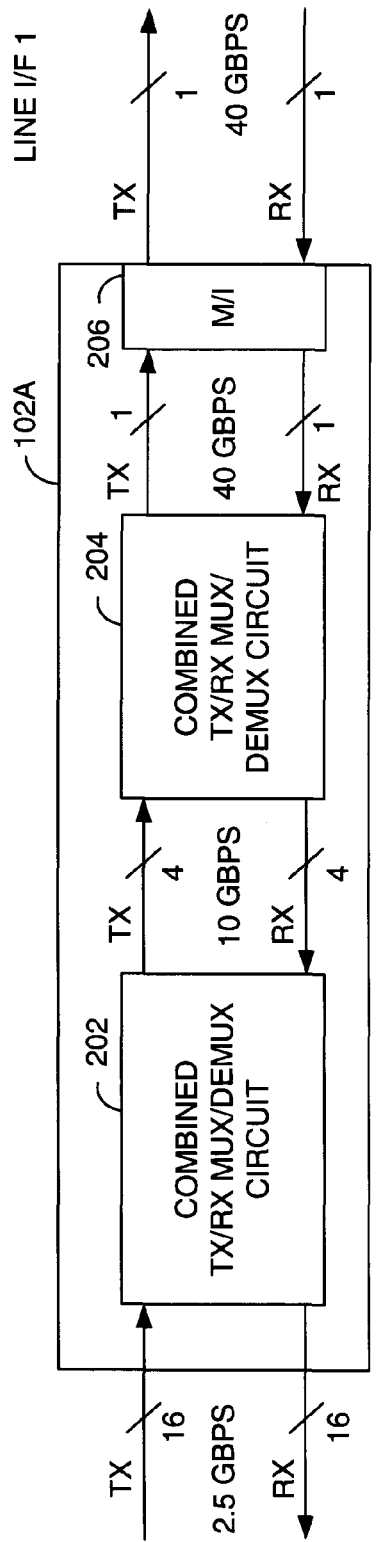
FIG. 2A is a block diagram illustrating one embodiment of a BSIM constructed according to the present invention.

FIG. 2A is a block diagram illustrating one embodiment of a BSIM 102A constructed according to the present invention. The BSIM 102A of FIG. 2A includes a first combined TX/RX multiplexer/demultiplexer circuit 202 and a second combined TX/RX multiplexer/demultiplexer circuit 204. On the line side of the BSIM 102A, the first combined TX/RX multiplexer/demultiplexer circuit 202 couples to a media, e.g., fiber optic cable or copper cable, via a media interface 206. Media interface 206 couples to the combined TX/RX multiplexer/demultiplexer circuit 204 via a 40 GBPS nominal bit rate, one bit transmit and one bit receive interface. The TX and RX line medias themselves each support one bit 40 Giga bits-per-second (GBPS) nominal bit rate communications, such as is defined by the OC-768 and/or SEC 768 specifications of the OIF.

The combined TX/RX multiplexer/demultiplexer circuit 202 interfaces with a communication ASIC, e.g. 104A, as shown in FIG. 1, via 16 TX bit lines and 16 RX bit lines, each operating at a nominal bit rate of 2.5 GBPS. Such interface supports a nominal total throughput of 40 GBPS (16*2.5 GBPS). The interface between the combined TX/RX multiplexer/demultiplexer circuit 202 and the combined TX/RX multiplexer/demultiplexer circuit 204 includes 4 TX bit lines and 4 RX bit lines, each operating at a nominal rate of 10 GBPS. This interface supports a nominal total throughput of 40 GBPS (4*10 GBPS). This interface may operate substantially or fully in accordance with an operating standard known as the Q40 operating standard. However, the teachings of the present invention are not limited to according to operation of the Q40 standard or is the description here intended to be a complete description of the Q40 standard itself.

Figure 2B:
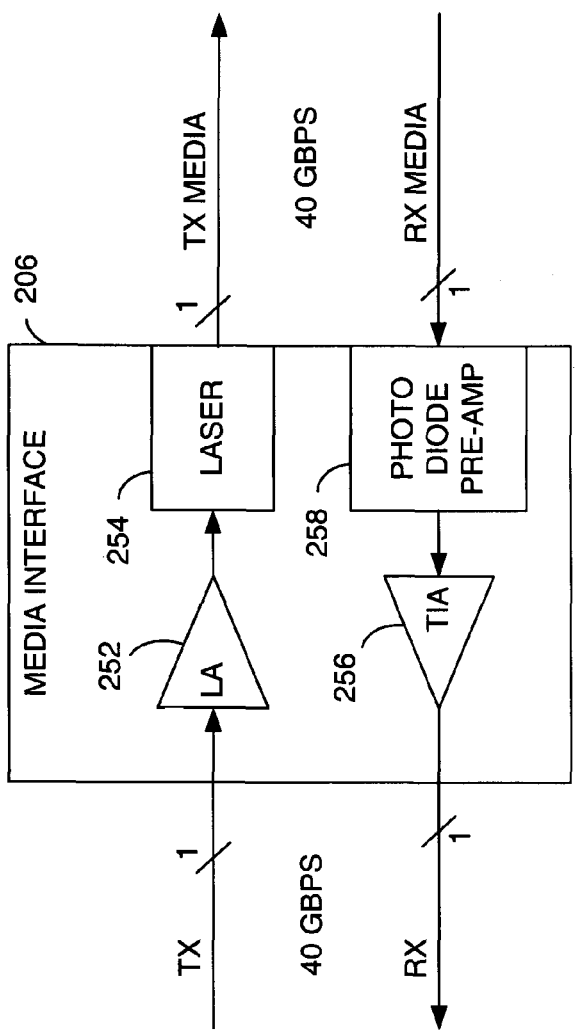
FIG. 2B is a block diagram illustrating an optical media interface that may be included with the BSIM of FIG. 2A.

FIG. 2B is a block diagram illustrating an optical media interface that may be included with the BSIM of FIG. 2A. As shown in FIG. 2B, media interface 206 couples to an optical media on a first side and couples to the combined TX/RX multiplexer/demultiplexer circuit 204 on a second side. In the transmit path, media interface 206 receives a single bit stream at a nominal bit rate of 40 GBPS from combined TX/RX multiplexer/demultiplexer circuit 204. The TX bit stream is amplified Limiting amplifier 252 amplifies the TX bit stream to produce a bit stream output received by laser 254. The laser produces an optical signal that is coupled to TX optical media.

On the receive side, an RX optical media produces the RX bit stream at a nominal bit rate of 40 GBPS. The RX bit stream is received by a photo diode/pre-amplifier combination 258. The photo diode/pre-amplifier combination 258 outputs to a transimpedance amplifier 256. Transimpedance amplifier 256 produces a single bit stream at a nominal bit rate of 40 GBPS that is provided to the combined TX/RX multiplexer/demultiplexer circuit 204 of FIG. 2A.

Figure 3:
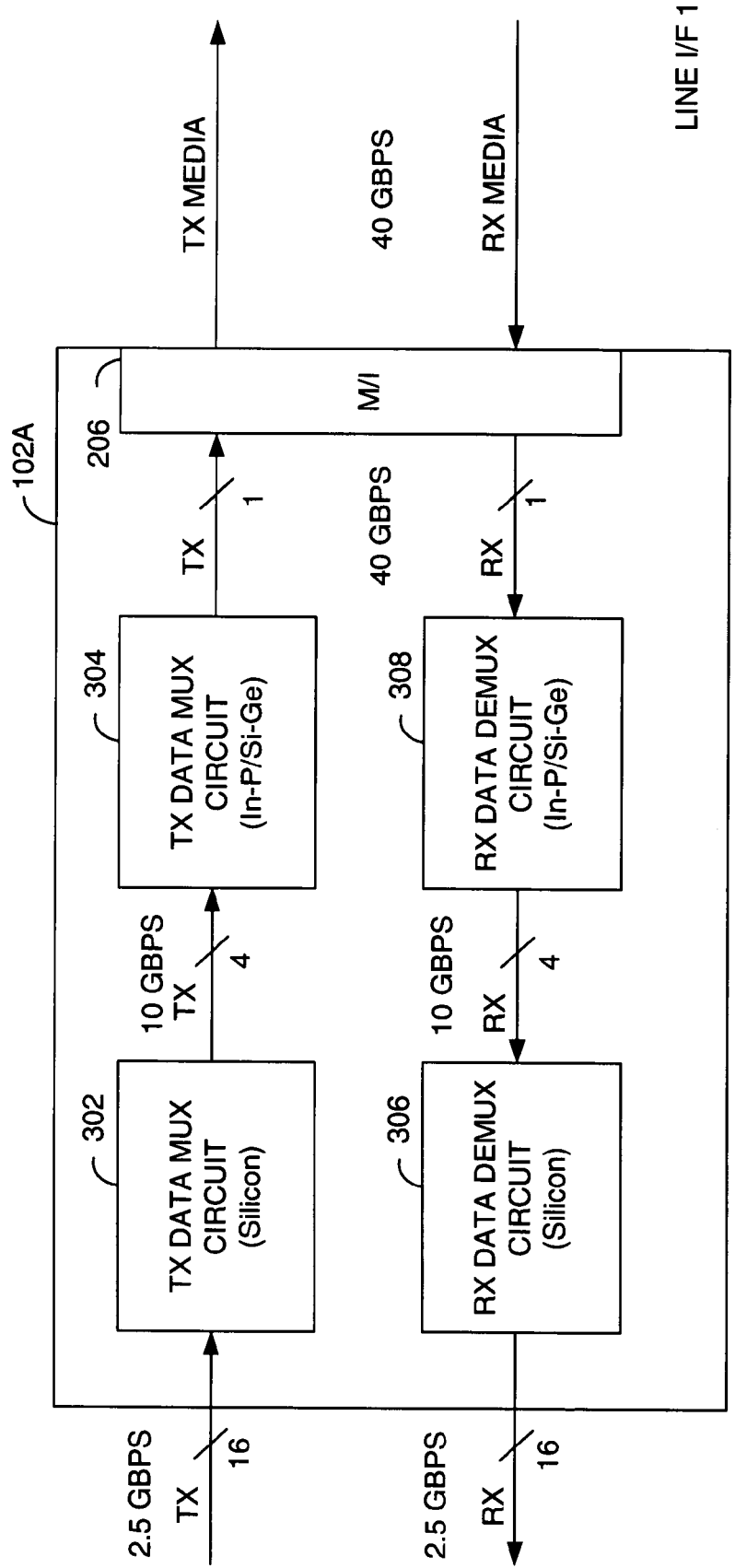
FIG. 3 is a block diagram illustrating another embodiment of a BSIM constructed according to the present invention.

FIG. 3 provides a block diagram illustrating another embodiment of a BSIM constructed according to the present invention. The embodiment of FIG. 3 differs from the embodiment of FIG. 2A in that separate TX and RX circuit components are employed. While FIG. 3 depicts media interface 206 as a single device, such as that shown in FIG. 2B, media interface 206 may be formed of separate circuits corresponding to the separate TX and RX paths shown in FIG. 2B.

In the TX path, TX data multiplexer circuit 302 receives a 16 bit wide by 2.5 GBPS nominal bit rate input from a coupled ASIC and produces a 4 bit wide×10 GBPS nominal bit rate TX output. In this embodiment, TX data multiplexer circuit 302 is constructed in a Silicon CMOS process, for example in a 0.13 micron CMOS process. However, any similar technology known to those skilled in the art may be employed in either the upstream or downstream TX/RX multiplexer/demultiplexer circuits. TX data multiplexer circuit 302 multiplexes the 16 bit wide by 2.5 GBPS nominal bit rate input to produce a 4 bit wide 10 GBPS nominal bit rate output, which is received by TX data multiplexer circuit 304. TX data multiplexer circuit 304 multiplexes the 4 bit wide×10 GBPS nominal bit rate output to produce a single bit wide output at a nominal bit rate of 40 GBPS.

TX data multiplexer circuit 304 switches at a frequency that is at least four times the rate at which TX data multiplexer circuit 302 switches. For this reason, TX data multiplexer circuit 304 may be required to be constructed in a manner that allows for switching rates that exceed those available using standard Si-CMOS processes. An Indium-Phosphate process, Silicon-Germanium process, or other similar process that supports higher switching rates may be used in this application. In this instance, the higher switching rate required stems from the 40 GBPS output of the TX data multiplexer circuit 304. As shown in FIG. 3, TX data multiplexer circuit 302 is constructed by Si-CMOS process and TX data multiplexer circuit 304 is constructed according to an Indium-Phosphate, Silicon-Germanium, or other like process that provides a high performance. This combination provides relatively low cost solution to the interfacing of a 2.5 GBPS nominal bit rate 16 bit wide interface to a 40 GBPS 1 bit wide interface. More generally, this combination provides the ability to stage high performance circuits with lower performing circuits in order to cost effectively interface data streams of differing bit rates.

Likewise, in the RX path, the bit stream interface module 102A includes an RX data demultiplexer circuit 308 that receives a single bit stream at a nominal bit rate of 40 GBPS data. RX data demultiplexer circuit 308 produces a 4 bit wide×10 GBPS nominal bit rate output. The RX data demultiplexer circuit 306 receives the 4 bit wide×10 GBPS nominal bit rate output and produces a 16 bit wide×2.5 GBPS nominal bit rate receive data stream.

As was the case with TX data multiplexer circuit 302 and TX data multiplexer circuit 304, RX data demultiplexer circuit 306 and RX data demultiplexer circuit 308 may be formed in differing process types. In particular, RX data demultiplexer circuit 306 may be constructed in a Silicon CMOS process. However, any like technology known to those skilled in the art may be used. While RX data demultiplexer circuit 308 is constructed using Indium-Phosphate, Silicon-Germanium, Gallium Nitride, Gallium Arsenic or other technology that supports higher switching speeds as known to those skilled in the art. This allows RX demultiplexer circuit 308 to support the higher switching speeds of the 1 bit wide×40 GBPS interface to the media interface 206.

FIG. 4A provides a block diagram illustrating a TX data multiplexer circuit constructed according to the present invention. As shown in FIG. 4A, the TX data multiplexer circuit 302 receives 16 bit steams of data at nominal bit rate of 2.5 GBPS on each bit line from the communication ASIC 104A. In this embodiment, each bit line of this 16 bit wide interface can operate at up to 3.125 GBPS. This interface also includes a DSCK clock and 622 MHz clock. The output of the TX data multiplexer circuit 302 includes 4 bit lines, each of which supports a nominal bit rate of 10 GBPS. Similarly, the output of TX data multiplexer circuit 302 can produce data at bit rates of between 9.95 GBPS and 12.5 GBPS. TX data multiplexer circuit 302 also produces a clock signal at one-half the nominal bit rate of the 4 bit stream paths. When the nominal bit rate of the data paths is 10 GBPS, the clock will be produced nominally at 5 GHz. The speeds or bit rates described here and throughout the application illustrate specific embodiments. However, it is understood that other speeds and bit rates may be similarly employed.

FIG. 4B provides a block diagram illustrating RX data demultiplexer circuit 306 constructed according to the present invention. As shown in FIG. 4B, RX data demultiplexer circuit 306 receives 4 bit streams at nominal bit rates of 10 GBPS each, but may operate in the range of 9.95 GBPS to 12.5 GBPS. RX data demultiplexer circuit 306 produces 16 bit stream outputs at a nominal bit rate of 2.5 GBPS. However, RX data demultiplexer circuit 306 may produce the 16 bit streams output at a bit rate as high as 3.125 GBPS.

Figure 5:
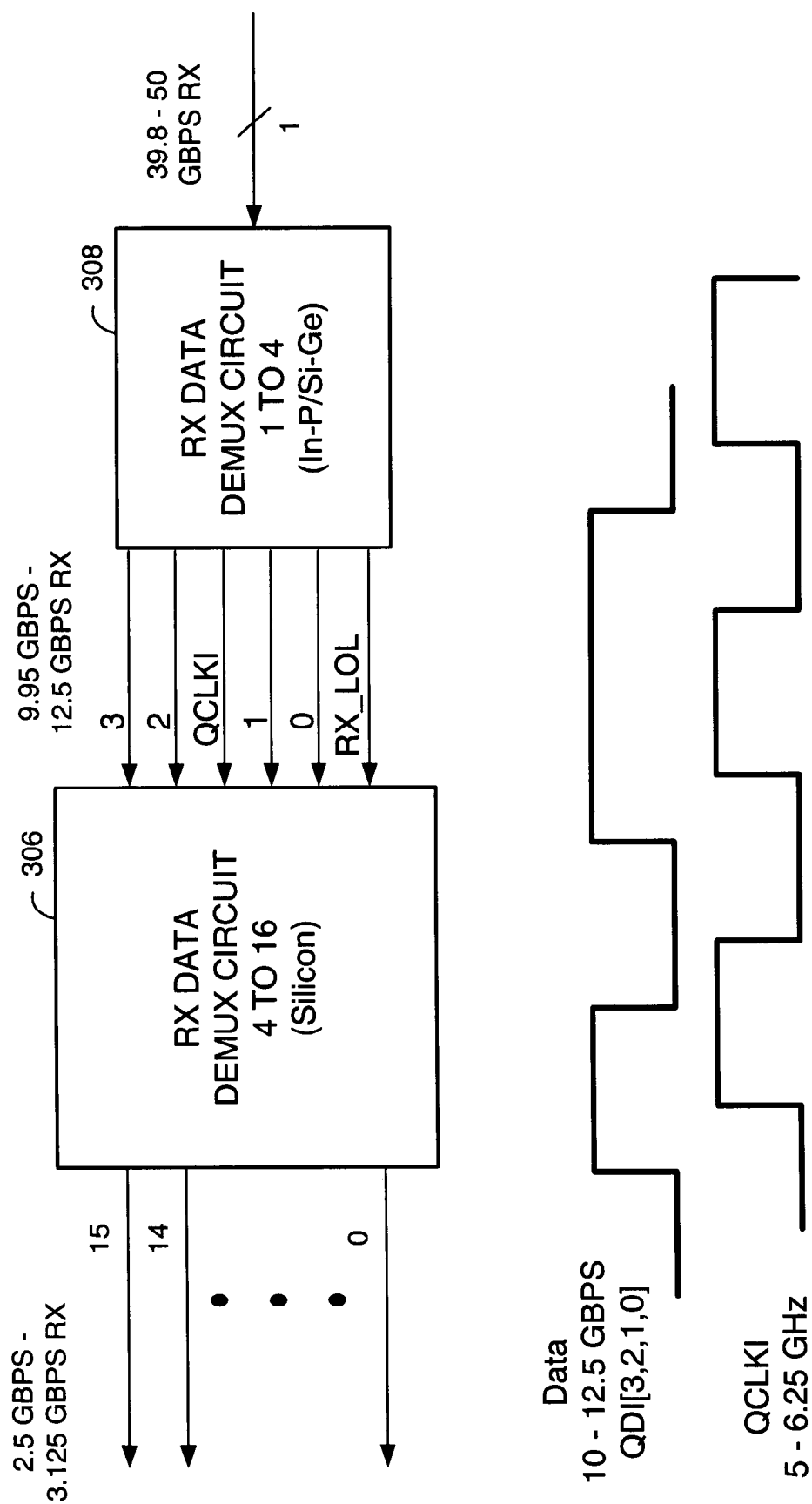
FIG. 5 is a block diagram illustrating the RX data demultiplexer circuits of FIG. 3 and the interfaces serviced thereby.

FIG. 5 provides a block diagram illustrating RX data demultiplexer circuits 306 and 308 of FIG. 3 and the interfaces serviced thereby. As is shown in FIG. 5, the RX data demultiplexer circuit 308 receives a single bit stream at a nominal bit rate of 40 GBPS. However, the single bit stream input may operate at any bit rates between 39.8 GBPS and 50 GBPS. RX data demultiplexer circuit 308 performs a demultiplexing operation, shown in FIG. 5 as a 1 to 4 demultiplexing operation, on the received single bit stream to produce 4 output bit streams at a nominal bit rate of 10 GBPS. However, RX data demultiplexer circuit 308 may also produce output at bit rates between 9.95 GBPS to 12.5 GBPS.

RX data demultiplexer circuit 306 receives the 4 bit streams having nominal bit rates of 10 GBPS each, a QCLKI signal, and a RX_LOL signal from RX data demultiplexer circuit 308. Based upon these input signals, the RX data demultiplexer circuit 306 produces the 16 bit stream outputs at nominal bit rates of 2.5 GBPS. Also shown in FIG. 5, the QCLKI signal operates at one-half the frequency of the bit rate of the data stream received from the RX data demultiplexer circuit 308. Thus, in such case, for the nominal bit rate of 10 GBPS, the QCLKI signal will be provided at 5 GHz.

Figure 6:
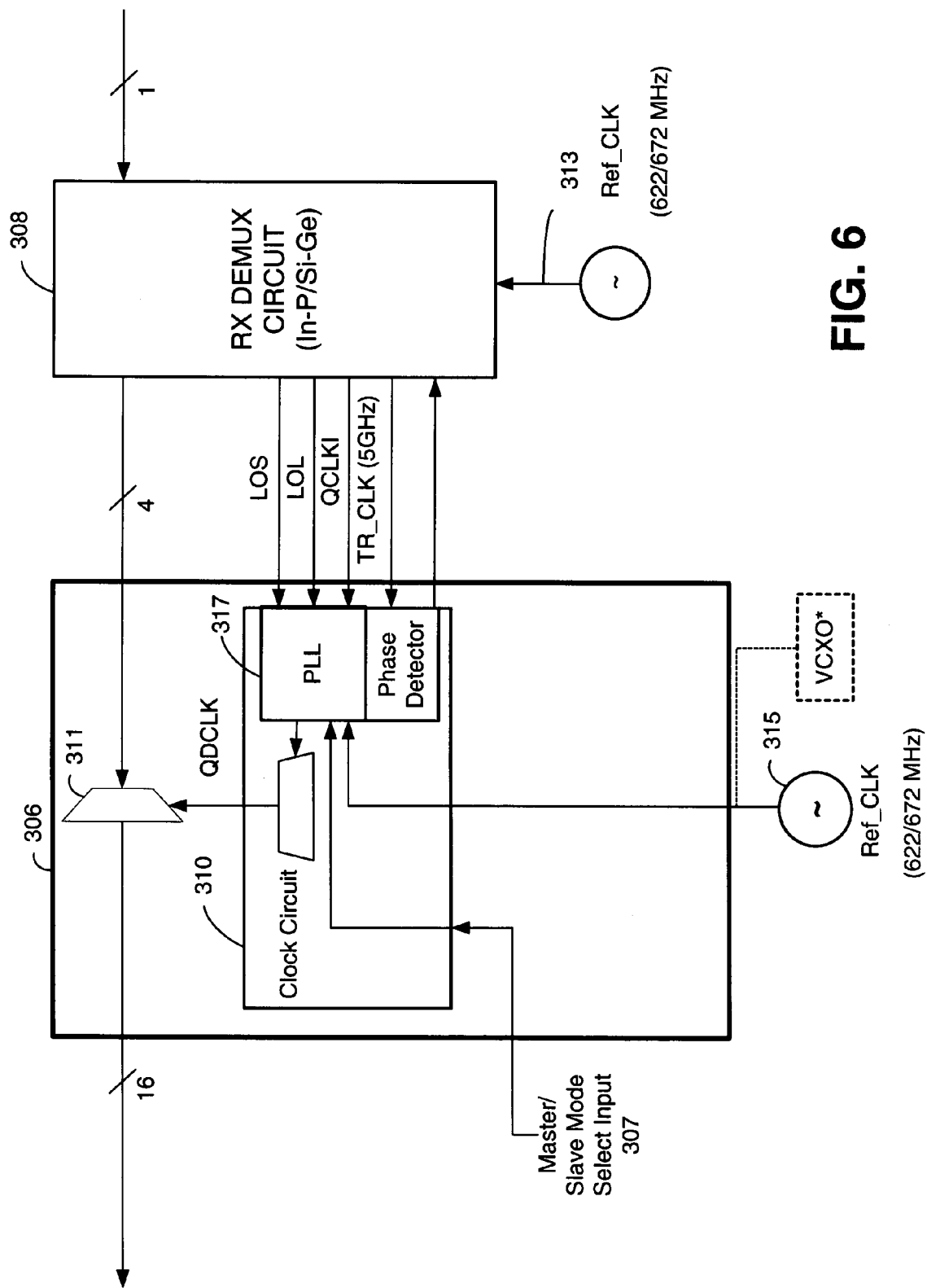
FIG. 6 provides a block diagram that functionally illustrates the many sources of the reference clock used to latch data from the upstream demultiplexer circuit.

FIG. 6 illustrates that RX data demultiplexer circuit 306 and the RX data demultiplexer circuit 308 each can be configured to operate as a master or slave. As previously discussed, it may be desirable to operate RX data demultiplexer circuit 306 as a slave because such a configuration would make the combination extremely responsive to changes in the media signal. In the slave mode, the clocked operation of RX data demultiplexer circuit 306 is completely controlled by the transmit data clock QCLKI. Master/slave mode select input 307 is forced to a binary state that selects transmit data clock QCLKI as the direct source of the Receive Data Clock QDCLK through demultiplexer 311.

In this configuration, RX data demultiplexer circuit 308 must police the generation of transmit data clock QCLKI. The transmit data clock QCLKI generates based on a clock recovered from the data received over the 40 GBPS bit stream. If the signal is lost, interrupted or compromised, the recovered clock is no longer reliable from which to provide the QCLKI. Because data is in the process of being demultiplexed, the QCLKI should not be interrupted. Thus, an oscillator or reference clock 313 is provided from which the transmit data clock may be derived (i.e. using a PLL which is not shown) when a LOS loss of or lock occurs.

It may also be desirable to operate RX data demultiplexer circuit 306 in the master mode. This configuration permits RX data demultiplexer circuit 308 to be simplified and streamlined as much as possible. Since integrated circuit manufacture using an In-P or Si-Ge process is more expensive than Si-CMOS manufacture, circuit 308 can be simplified to reduce cost and increase manufacturing yields.

In one scenario, the master/slave mode select is forced to the opposite state to place RX data demultiplexer circuit 306 into the master mode. In this case, the demultiplexer 311 does not bypass the PLL, and instead QDCLK derives from the PLL Data Clock. PLL Data Clock generates from QCLKI, an oscillator, or other reference clock. In normal operations, PLL Data Clock will be based on the QCLKI. However, if an LOS occurs indicating that QCLKI is no longer valid, or that the signal has been interrupted, PLL 317 immediately begins to derive PLL Data Clock from oscillator or reference clock 315. This action can also be taken in response to loss of lock (LOL) signal, which indicates that QCLKI is no longer locked with the data streams being transmitted.

RX data demultiplexer circuit 306 also includes the ability to use PLL 317 and associated logic circuits to monitor frequency deviation between QCLKI and other references to produce a phase adjustment signal necessary to reduce the frequency deviation. This adjustment occurs when the frequency deviation exceeds a predetermined level. Thus, RX data demultiplexer circuit 306 may interface with upstream RX data demultiplexer circuit 308 acting in a master mode to ensure quick reaction to changes in the media input, or to act itself in the master mode and handle the complexities of clock generation and alignment.

Since clock and data both generate externally to RX data demultiplexer circuit 306, and because the data and clock signals travel over PC board traces having varying lengths and parasitic loads, there is a very strong potential for skewing to occur between the clock QCLKI and data the 4 bit streams generated by InP circuit 308. Given the high speed at which these inputs operate, little room exists for delay caused by mismatches between the clock and data signals. Signal delay methods can operate to guarantee that the clock data relationship will comport with the specifications established for that relationship. Further, each vague data path across the PCB may produce data that is not aligned upon receipt by RX data demultiplexer circuit 306.

FIG. 7 includes a table and a diagram that illustrate operating specifications for the RX interface between the RX data demultiplexer circuits 308 and 306 of FIG. 3. As shown in FIG. 7, the receiver input parameters are shown at 800 and an equivalent circuit thereupon is shown at 802.

Figure 8:
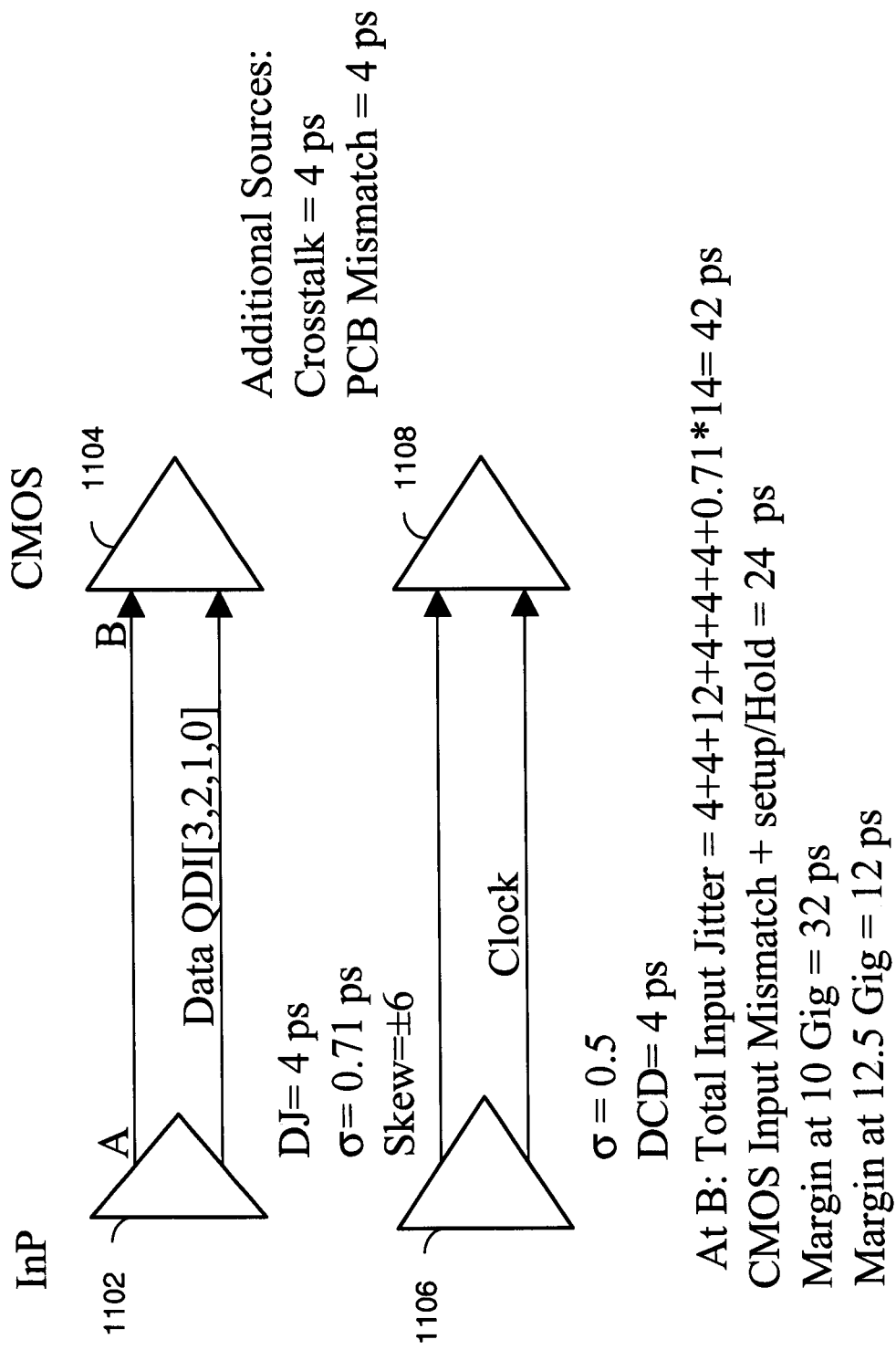
FIG. 8 is a block diagram illustrating the RX data multiplexer circuits of FIG. 3 can be configured in a master/slave or a slave/master configuration in accordance with the present invention.

FIG. 8 provides a block diagram illustrating the jitter allocation for the RX link between RX data demultiplexer circuits 308 and 306 of FIG. 3. One of four data differential data line drivers 1102 of RX data demultiplexer circuit 308 and a differential clock driver 1106 of RX data demultiplexer circuit 308 on the 4 bit stream 10 GBPS side are shown. FIG. 8 also depicts one of four data input buffers 1104 of the RX data demultiplexer circuit 306 and a clock input buffer 1108 of the RX data demultiplexer circuit 306. As is indicated, deterministic jitter for the data interface is specified as a maximum of 8 picoseconds. Further, the skew or non-deterministic jitter in the data lines is limited to ±8 picoseconds. The additional information provided in FIG. 8 shows how these jitters may be summed to result in maximum jitters.

Figure 9:
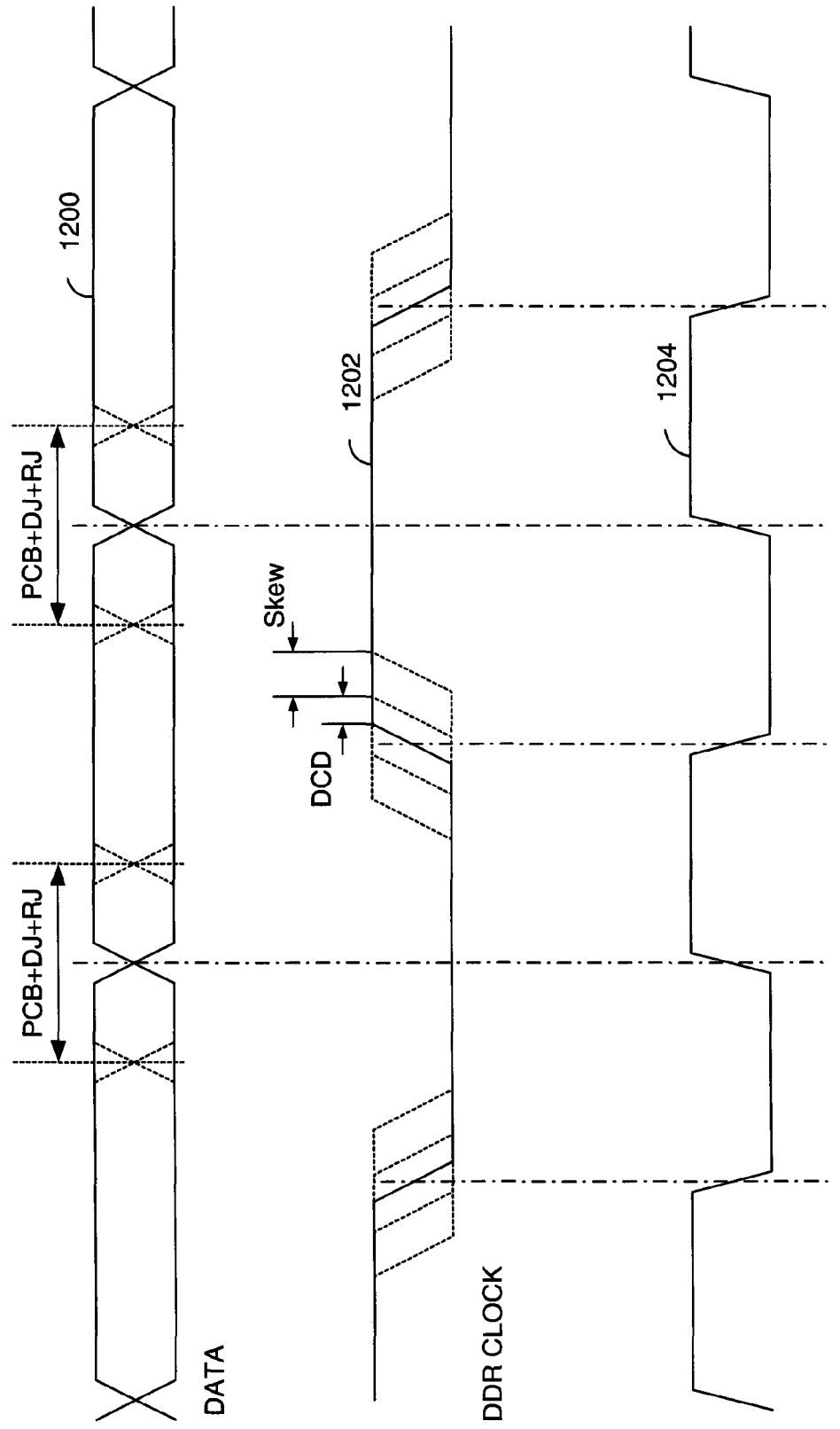
FIG. 9 includes timing diagrams illustrating the set up and hold operations on the 4 bit wide×10 GBPS links between the RX data demultiplexer circuits of FIG. 3.

FIG. 9 is a timing diagram illustrating the set up and hold operations on the 4 bit×10 GBPS links between the TX data demultiplexer integrated circuits 306 and 308 of FIG. 3. In particular, the diagram illustrates the jitter relationships and definitions of the data 1200, the DDR clock 1202 and a full rate clock 1204.

Figure 10:
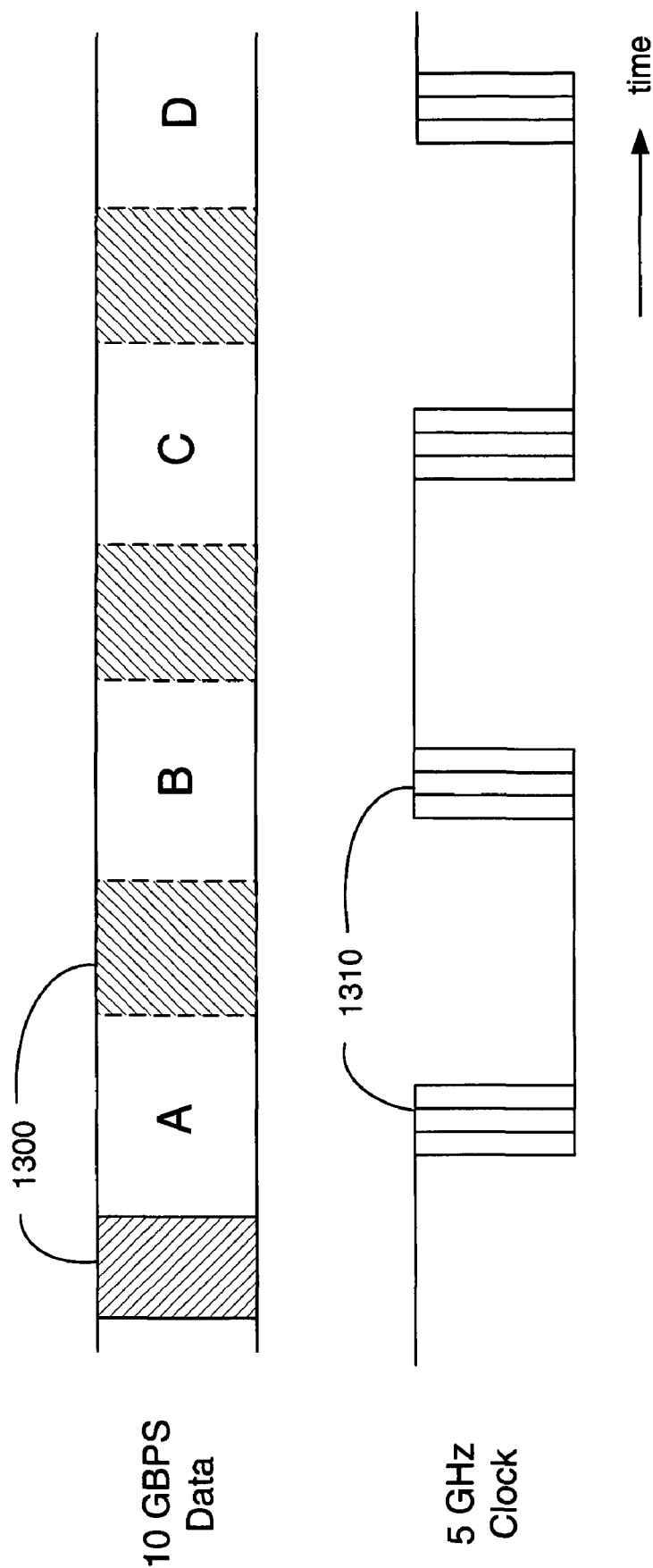
FIG. 10 provides an illustration of the jitter that can be experienced by the four 10 GPBS data inputs in relation to the jitter experienced by the 5 GHz clock input between the RX data demultiplexer circuits of FIG. 3.

FIG. 10 illustrates jitter that can be experienced by the four 10 GPBS data inputs in relation to the jitter experienced by the 5 GHz clock input to RX data demultiplexer circuit 306. Because of this jitter, there is little or no room for error regarding the skewing that can be permitted to occur between the clock arriving at the various demultiplexers within RX data demultiplexer circuit 306 and the data to be demultiplexed by RX data demultiplexer circuit 306. Given the amount of jitter 1300 that can occur on the data, in combination with the jitter 1310 that can occur on the clock, and the frequency at which the clock and data are switching, there is very little guaranteed open window during which the data can be latched.

Figure 11:
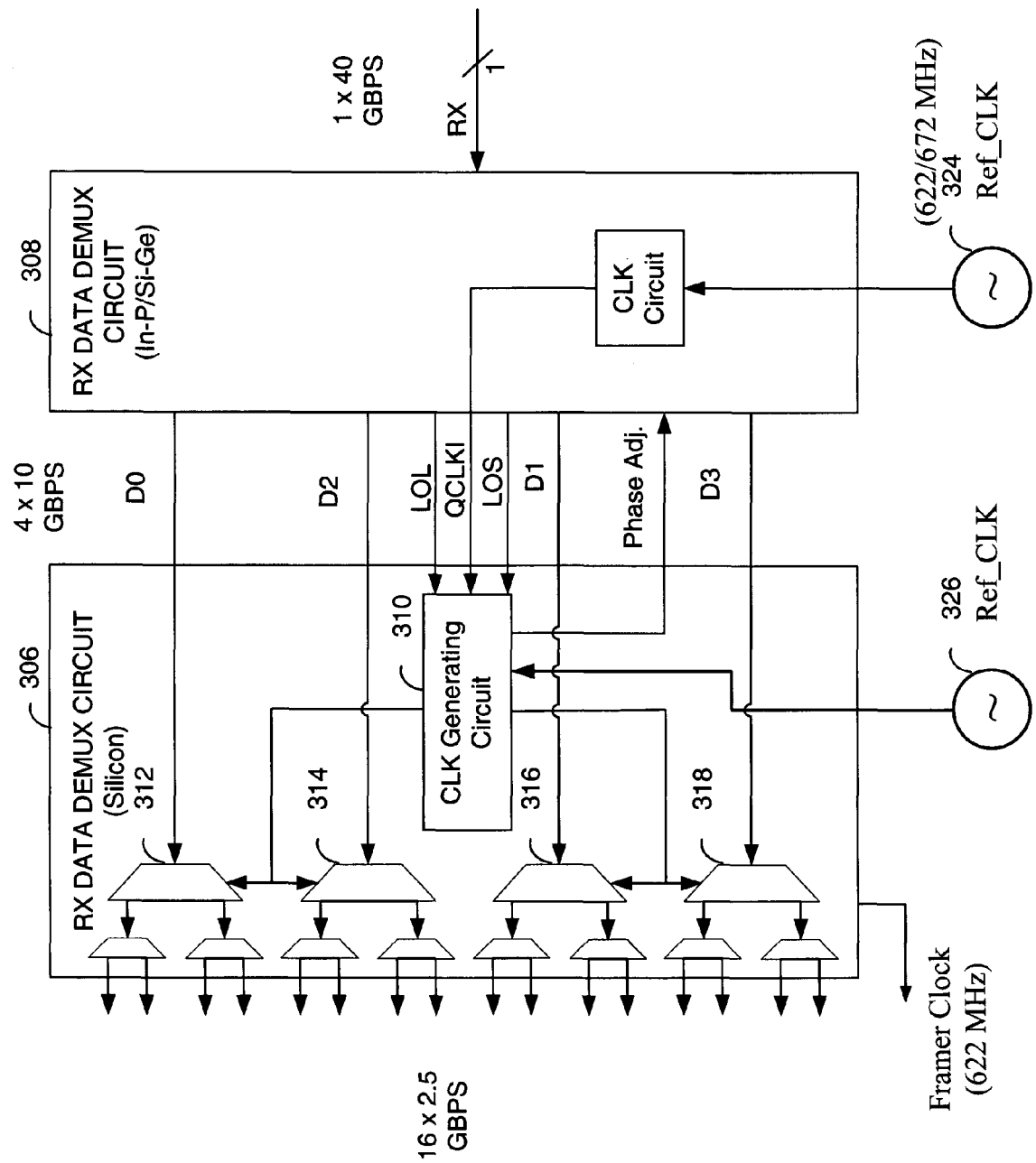
FIG. 11 depicts a "smart" first stage demultiplexing circuit coupled to a second stage demultiplexing circuit.

The present invention, as shown in the block diagram provided in FIG. 11, allows a "smart" demultiplexer circuit 308 to receive a high data rate signal, such as the 40 GBPS. Staging the demultiplexing process between demultiplexer circuits 306 and 308 allows the complexity of the high performance circuits (higher switching rate capable circuit) contained within demultiplexer 308 to be minimized. However, as shown in FIG. 11, reference clock generation may occur within demultiplexer 308. Simplifying demultiplexer 308 allows power consumption, complexity and the number of gates previously located within demultiplexer circuit 308 to be shifted to lower technology and less expensive demultiplexer circuit 306. This division achieves an improved power consumption and reduced cost of manufacture. The functions within demultiplexer circuit 308 may be minimized, being limited to only those processes requiring higher performing circuits. It should be noted that, although a relatively exotic and high-performing technology is depicted in this embodiment of demultiplexer circuit 308, one should realize that Si CMOS processes or other similar technologies may be used for both demultiplexer circuits 306 and 308.

Figure 12:
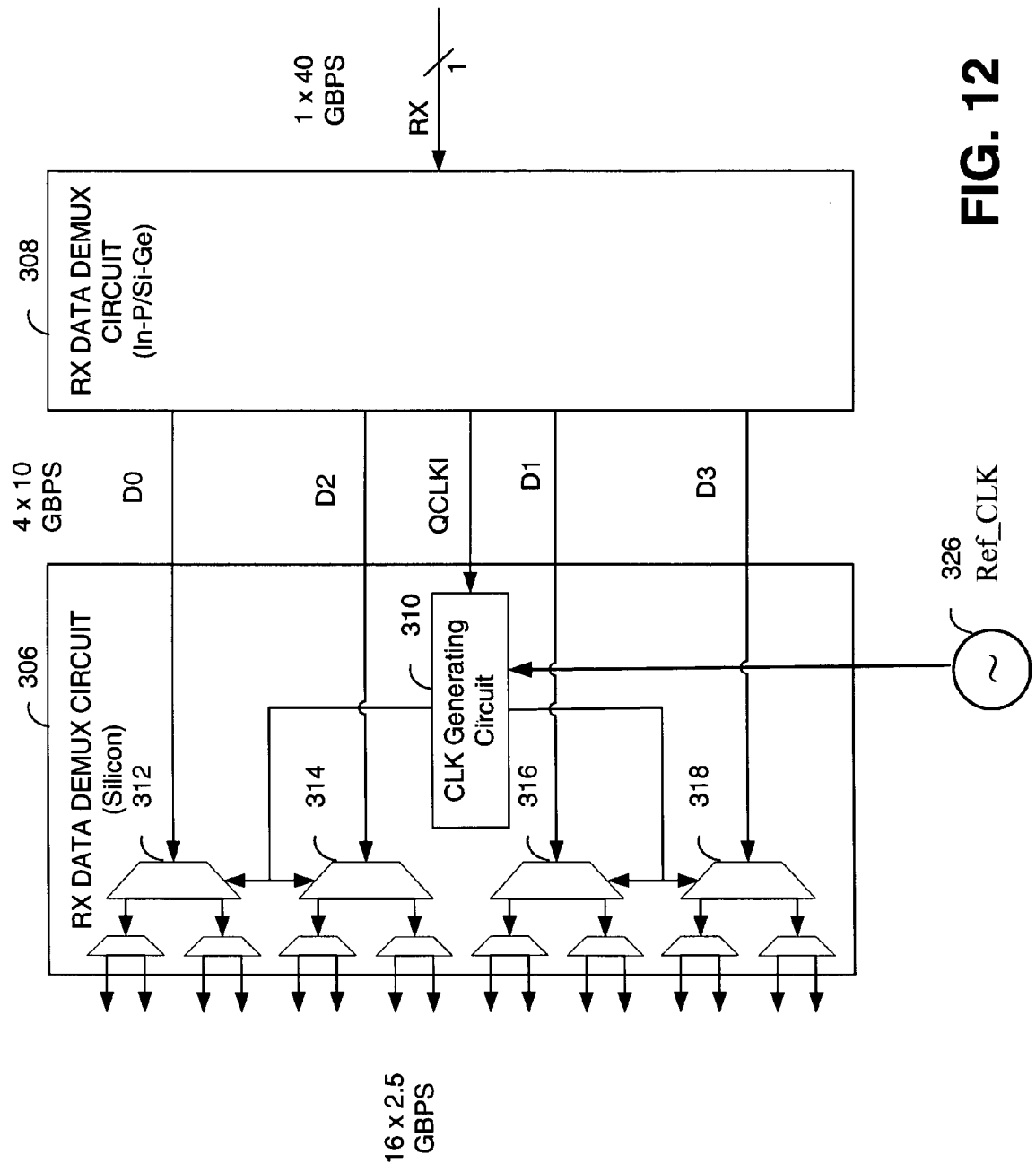
FIG. 12 depicts a "dumb" first stage demultiplexing circuit coupled to a second stage demultiplexing circuit.

FIG. 12 depicts an instance where demultiplexer circuit 306 acts in a master role with respect to "dumb" demultiplexer circuit 308. In this embodiment, as many functions of the clock circuitry as possible are transferred from demultiplexer circuit 308. This reduces the complexity and cost of demultiplexer 308. When operating in the master mode, the clock circuit 310 generates a clock signal based upon an internal or external reference clock signal such as that provided by reference clock 326. This signal may also be generated by a crystal oscillator or similar circuit known to those skilled in the art. Clock circuit 310 generates a clock signal from an internal or external reference that here does not need to originate within demultiplexer circuit 308. The operation of demultiplexer circuit 306 in either a master or slave mode may be directed by input selector 307 to set the operation of demultiplexer circuit 306 in either a master or slave mode with respect to upstream demultiplexer circuit 308.

FIG. 13 provides a logic diagram that illustrates what occurs when the multi-stage demultiplexer deviates from normal operations 350. If a loss of signal (LOS) is experienced as indicated at block 352, meaning there is no longer a signal being received from the media input into demultiplexer circuit 308, the circuit stops demultiplexing until the media signal is re-obtained in block 354. Once the signal has been re-obtained, then data will be synchronized at block 356 and normal operations 350 resume. The present invention allows data to be quickly synchronized following deviations from normal operations in relatively few bytes as opposed to previous solutions which may have required hundreds of bytes to synchronize.

A second deviation from normal operations 350 involves a Loss Of Lock (LOL) indication. When LOL occurs, the circuit hunts in step 360 until lock re-establishes at block 362. Once lock has been re-established, normal operations 350 resume. A third deviation from normal operations 350 involves a required phase-adjustment. When required as indicated at block 364, an adjustment signal may be generated at step 366 and supplied to the upstream demultiplexer circuit. Following proper phase-adjustment in step 368, normal operations 350 resume.

Figure 14A:
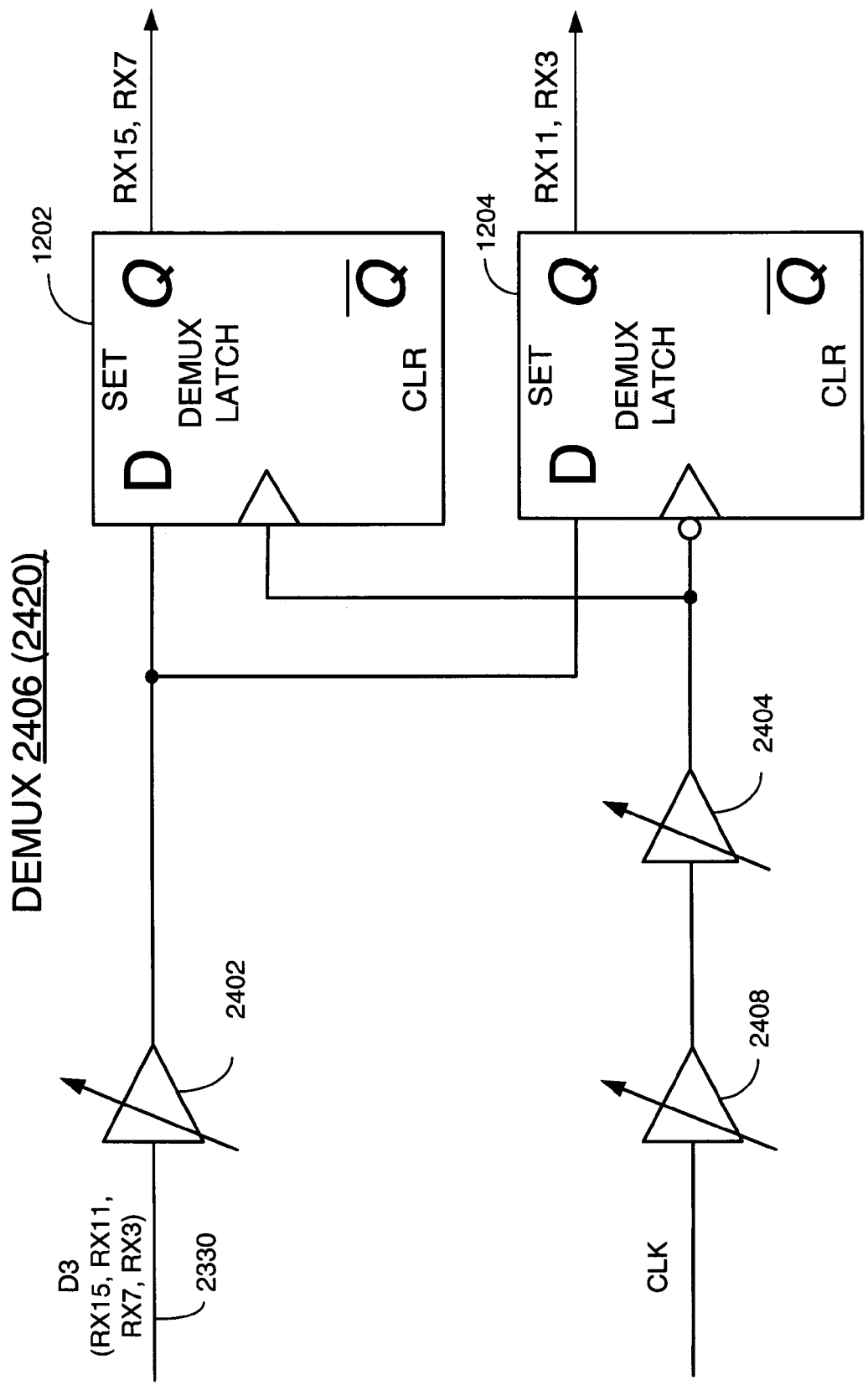
FIG. 14A is a block diagram illustrating a structure employed to implement demultiplexers of the CMOS RX data demultiplexer circuit according to the present invention.

FIG. 14A is a block diagram illustrating a structure employed to implement demultiplexers. The structure of FIG. 14A illustrates the relationship of the data and clock inputs to the delay elements 2402, 2404, and 2408. Demultiplexer latches 1202 and 1204 couple to data input and a common clock input from the output of second-level delay element 2404. Demultiplexer latch 1202 triggers on the positive edge of the clock while demultiplexer latch 1204 triggers on the negative edge of the clock. On the positive edge of a first clock cycle, bit RX15 is latched into demultiplexer latch 1202 and provided as an output. On the negative edge of the first clock cycle, RX11 is latched into demultiplexer latch 1204 and provided as an output. During a next clock cycle bit RX7 is latched into demultiplexer latch 1202 on a positive edge and provided as an output while RX3 is latched into demultiplexer latch 1204 on a negative edge and provided as an output.

Figure 14B:
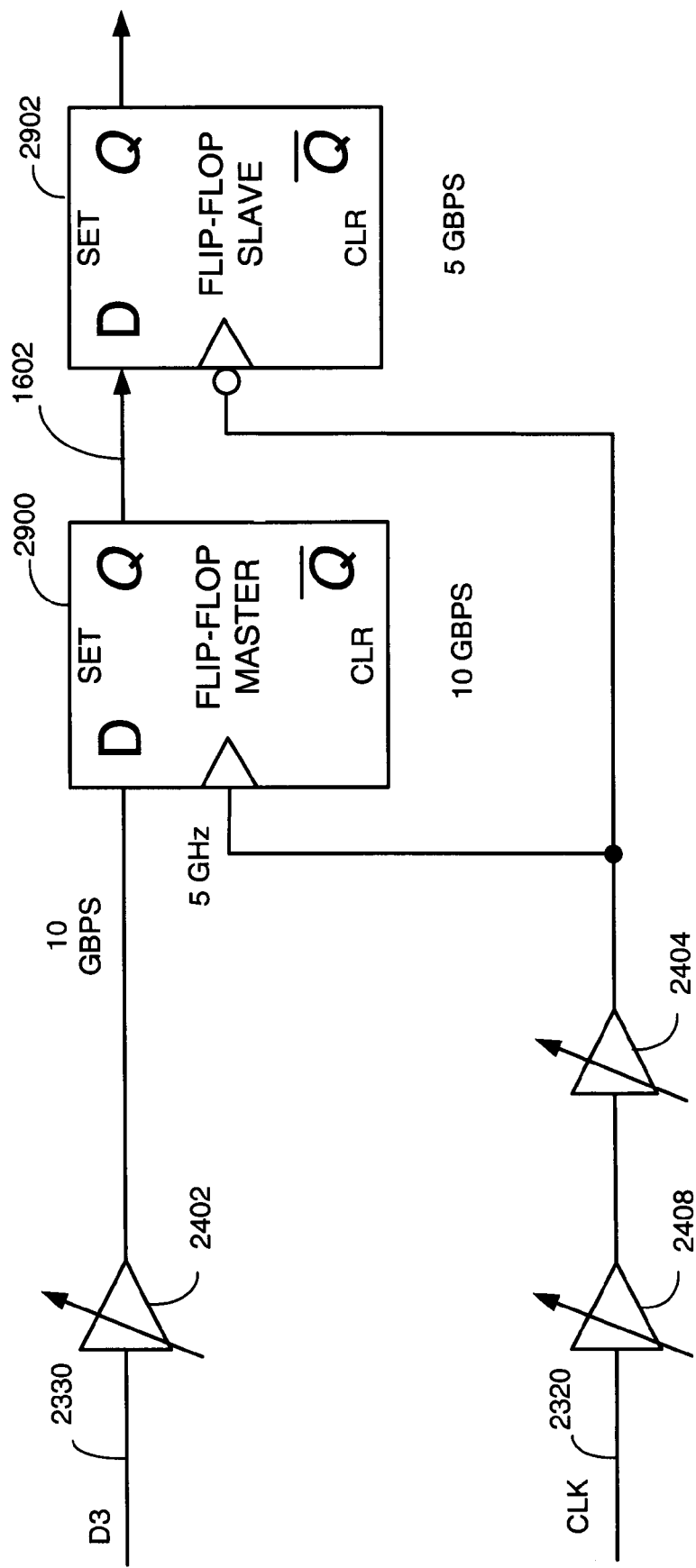
FIG. 14B is a block diagram illustrating a master/slave flip-flop arrangement used for the demultiplexer latches of FIG. 14A.

FIG. 14B provides a block diagram illustrating a master/slave flip-flop arrangement used for the demultiplexer latches of FIG. 14A. This particular master/slave flip-flop arrangement is used for implementing demultiplexer latches 1202 and 1204. In typical applications, the D flip-flops that implement demultiplexer latches 1202 and 1204 are clocked at the same rate as their incoming data. They are positive edge triggered, so the flip-flop master 2900 and flip-flop slave 2902 also clock at the same frequency as the incoming data D3 2330. In that case both the flip-flop master 2900 and flip-flop slave 2902 operate at the data rate, which in the case of the RX data demultiplexer circuit 306, is 10 GBPS. As previously discussed, flip flops (and the latches contained therein) capable of operating at 10 GBPS in a conventional 0.13 µCMOS process each requires two very large inductors to compensate for the parasitic capacitance that is problematic at such high frequencies of operation. Thus, in the example of the RX data demultiplexer circuit 306, four channels each having four demultiplexers, each having two D flip-flops, each having two latches translates to thirty-two very large inductors to implement the system at 10 GBPS. The die area for this implementation would be enormous and costly.

However, because the demultiplexers are set up to operate such that demultiplexer latches 1202, 1204 alternate clocking data on opposite edges of a 5 GHz clock, the flip-flop slave 2902 of the demultiplexer latches 1202, 1204 can be implemented with a design that operates at only 5 GHz. Flip-flop master 2900 still receives 10 GBPS data in over data line D3 2330, and therefore must still be able to read data at that rate (even though it clocks in only every other bit on the positive edge of the 5 GHz clock 2320). Because flip-flop slave 2902 is receiving only every other bit of D3 2330 at 5 GHz, and because it is only being clocked at 5 GHz, it is able to function with a design that need only accommodate a 5 GBPS data rate and 5 GHz clock. Such a design may be implemented in the conventional 0.13 µCMOS process without need for an inductor. Thus, only half of the inductors would be needed (i.e. 16 rather than 32), which provides a tremendous saving in die area over a conventional demultiplexing flip-flop implementation.

The invention disclosed herein is susceptible to various modifications and alternative forms. Specific embodiments therefore have been shown by way of example in the drawings and detailed description. It should be understood, however, that the drawings and detailed description thereto are not intended to limit the invention to the particular form disclosed, but on the contrary, the invention is to cover all modifications, equivalents and alternatives falling within the spirit and scope of the present invention as defined by the claims.

The invention claimed is:

1. A bit stream demultiplexer having a switchable master slave relationship comprising:
   a first demultiplexing integrated circuit that receives at least one input signal and outputs a plurality of first bit streams at a first bit rate;
   a second demultiplexing integrated circuit that receives the plurality of first bit streams and outputs a plurality of second bit streams at a second bit rate, wherein the plurality of second bit streams are greater in number than the plurality of first bit streams, and wherein the first bit rate is greater than the second bit rate; and
   a clock circuit, wherein the clock circuit generates a clock signal for the first demultiplexing integrated circuit based upon a reference clock signal when the second demultiplexing integrated circuit operates in a master mode, and wherein the clock circuit generates the clock signal based upon an external clock signal received from the first demultiplexing integrated circuit when the second demultiplexing integrated circuit operates in a slave mode.

2. The bit stream demultiplexer of claim 1, wherein the plurality of first bit streams comprise 4 bit streams and the plurality of second bit streams comprise 16 bit streams.

3. The bit stream demultiplexer of claim 1, further comprising an input selector operable to direct the second demultiplexing integrated circuit to operate in either a master or slave mode with respect to the first demultiplexing integrated circuit.

4. The bit stream demultiplexer of claim 1, wherein the clock circuit comprises:
   a phased locked loop (PLL); and
   a clock selection input having an output coupled to the PLL, a first input coupled to receive the reference clock signal, and a second input coupled to receive the external clock signal.

5. The bit stream demultiplexer of claim 1, wherein the first demultiplexing integrated circuit operates with an internal clock speed higher than an internal clock speed of the second demultiplexing integrated circuit.

6. The bit stream demultiplexer of claim 1, wherein the first demultiplexing integrated circuit comprises integrated circuits formed on a first substrate selected from the group consisting of InP, SiGe, GaN, GaAs, and Si and wherein the second demultiplexing integrated circuit comprises integrated circuits formed on a Si substrate.

7. The bit stream demultiplexer of claim 1, further comprising at least one additional demultiplexing integrated circuit operable to receive the plurality of output bit streams from the second demultiplexing integrated circuits and produce an additional plurality of output bit streams greater in number than those bit streams received by the at least one additional demultiplexing integrated circuits.

8. The bit stream demultiplexer of claim 1, wherein the external clock signal used when the second demultiplexing integrated circuit operates in slave mode is generated by a crystal oscillator.

9. The bit stream demultiplexer of claim 1, wherein the input signal has a data rate between about 40 to about 50 Gigahertz.

10. The bit stream demultiplexer of claim 1, wherein the first bit rate has a data rate between about 10 to about 12.5 Gigahertz.

11. The bit stream demultiplexer of claim 1, wherein the second bit rate has a data rate between about 2.5 to about 3.125 Gigahertz.

12. The bit stream demultiplexer of claim 1, wherein the clock circuit comprises a phase locked loop (PLL) within the second demultiplexing integrated circuit that further comprises:
   a first reference clock input coupled to receive the external clock signal generated by the first demultiplexing integrated circuit;
   a second reference clock input coupled to receive the reference clock signal; and
   a first output producing a PLL Data Clock, wherein the PLL generates the PLL Data Clock based on one of the first and second reference clock inputs based on the state of a select input to the second demultiplexing integrated circuit.

13. The bit stream demultiplexer of claim 12, wherein the PLL Data Clock provides a Receive Data Clock with which the second demultiplexing integrated circuit latches data of the received first plurality of bit streams when a master/slave mode select input is forced to a first binary state.

14. The bit stream demultiplexer of claim 13, further comprising a loss of signal indication output from the first demultiplexing integrated circuit and input to the second demultiplexing integrated circuit to indicate that the input signal has stopped.

15. The bit stream demultiplexer of claim 12, wherein the PLL generates the Receive Data Clock based on the second reference clock input when the second demultiplexing integrated circuit receives a loss of signal indication from the first demultiplexing integrated circuit.

16. The bit stream demultiplexer of claim 12, wherein the PLL monitors frequency deviation between the first reference clock input and the second reference clock input, and the PLL produces a phase adjustment signal to the first demultiplexing integrated circuit to compensate for frequency deviation exceeding a predetermined amount.

17. The bit stream demultiplexer of claim 16, wherein the external clock signal generated by the first data demultiplexing integrated circuit, is based on a clock recovered from the at least one input signal.

18. The bit stream demultiplexer of claim 12, wherein the PLL Data Clock is bypassed to provide a Receive Data Clock based on the external clock signal with which the second demultiplexing integrated circuit latches data of the first plurality of bit streams when a master/slave mode select input forces the second demultiplexing integrated circuit to operate in a slave mode.

19. A multistage demultiplexing circuit having a switchable master slave relationship between stages comprising:
   an input port operable to receive a data input at an input bit rate coupled to a first stage demultiplexing integrated circuit that outputs a plurality of first bit streams at a first bit rate based on the data input;
   a second stage demultiplexing integrated circuit that receives the plurality of first bit streams and outputs a plurality of second bit streams at a second bit rate, wherein the plurality of second bit streams are greater in number than the input bit streams, and wherein the first bit rate is greater than the second bit rate; and
   a master/slave selector operable to determine the master slave relationship between the first stage demultiplexing integrated circuit and the second stage demultiplexing integrated circuit; and
   a clock circuit that generates a clock signal for the first demultiplexing integrated circuit based upon a reference clock signal when the second demultiplexing integrated circuit operates in a master mode, and wherein the clock circuit generates the clock signal based upon an external clock signal received from the first demultiplexing integrated circuit when the second demultiplexing integrated circuit operates in a slave mode.

20. The multistage demultiplexing circuit of claim 19, wherein the plurality of first bit streams comprise 4 bit streams and the plurality of second bit streams comprise 16 bit streams.

21. The multistage demultiplexing circuit of claim 19, wherein the clock circuit comprises:
   a phased locked loop (PLL); and
   a clock selection input having an output coupled to the PLL, a first input coupled to receive the reference clock signal, and a second input coupled to receive the external clock signal.

22. The multistage demultiplexing circuit of claim 21, wherein the PLL further comprises:

a first reference clock input coupled to receive the external clock signal generated by the first stage demultiplexing integrated circuit;

a second input coupled to receive the external clock signal; and a first output producing a PLL Data Clock, wherein the PLL generates the PLL Data Clock based on one of the first and second reference clocks inputs based on the state of a select input to the second stage demultiplexing integrated circuit.

23. The multistage demultiplexing circuit of claim 22, wherein the PLL Data Clock provides a Receive Data Clock with which the second stage demultiplexing integrated circuit latches data of the received first plurality of bit streams when a master/slave mode select input is forced to a first binary state.

24. The multistage demultiplexing circuit of claim 22, wherein the first PLL generates the Receive Data Clock based on the second reference clock input when the second stage demultiplexing integrated circuit receives a loss of signal indication from the first stage demultiplexing integrated circuit.

25. The multistage demultiplexing circuit of claim 24, wherein loss of signal indication outputs from the first stage demultiplexing integrated circuit and inputs to the second stage demultiplexing integrated circuit to indicate that data input signal has stopped.

26. The multistage demultiplexing circuit of claim 22, wherein the PLL monitors frequency deviation between the first reference clock and the second reference clock, and the PLL has a second output that produces a phase adjustment signal to the first stage demultiplexing integrated circuit to compensate for frequency deviation exceeding a predetermined amount.

27. The receive data demultiplexer integrated circuit of claim 22, wherein the PLL has a first clock reference input coupled to receive a local oscillator clock and a second clock reference coupled to receive the external clock signal; and wherein the PLL generates the PLL Data Clock based on the first clock reference input when a reference select signal is forced to a first state and the second clock reference input when the reference select input is a second state.

28. The multistage demultiplexing circuit of claim 19, wherein the first stage demultiplexing integrated circuit operates with an internal clock speed higher than an internal clock speed of the second stage demultiplexing integrated circuit.

29. The multistage demultiplexing circuit of claim 19, wherein the first stage demultiplexing integrated circuit comprises integrated circuits formed on a first substrate selected from the group consisting of InP, SiGe, GaN, GaAs, and Si and wherein the second stage demultiplexing integrated circuit comprises integrated circuits formed on a Si substrate.

30. The multistage demultiplexing circuit of claim 19, wherein the input bit rate is between about 40 to about 50 Gigahertz.

31. The multistage demultiplexing circuit of claim 19, wherein the first bit rate has a data rate between about 10 to about 12.5 Gigahertz.

32. The multistage demultiplexing circuit of claim 19, wherein the second bit rate has a data rate between about 2.5 to about 3.125 Gigahertz.

33. A method of coupling high-speed bit stream input signals to a multistage demultiplexing integrated circuit comprising the steps of:

receiving the input signal at a first stage demultiplexing integrated circuit;

demultiplexing the input signal into a plurality of first bit streams and outputting the plurality of first bit streams at a first bit rate;

receiving the plurality of first bit streams at a second stage demultiplexing integrated circuit;

demultiplexing the plurality of first bit streams into a plurality of second bit streams and outputting the plurality of second bit streams at a second bit rate, wherein the second bit streams are greater in number than the input bit streams, and wherein the first bit rate is greater than the second bit rate; and generating a clock signal for the second stage demultiplexing integrated circuit based upon a reference clock when the second stage demultiplexing integrated circuit operates in a master mode, and generating the clock signal based upon an external clock signal received from the first stage demultiplexing integrated circuit when the second stage demultiplexing integrated circuit operates in a slave mode.

34. The method of claim 33, wherein the plurality of first bit streams comprise 4 bit streams and the plurality of second bit streams comprise 16 bit streams.

35. The method of claim 33, further comprising the step of directing the second stage demultiplexing integrated circuit to operate in either a master or slave mode with respect to the first stage demultiplexing integrated circuit.

36. The method of claim 33, further comprising the step of operating the first stage demultiplexing integrated circuit at an internal clock speed higher than an internal clock speed of the second stage demultiplexing integrated circuit.

37. The method of claim 33, wherein the first stage demultiplexing integrated circuit comprises integrated circuits formed on a first substrate selected from the group consisting of InP, SiGe, GaN, GaAs, and Si and wherein the second stage demultiplexing integrated circuit comprises integrated circuits formed on a Si substrate.

38. The method of claim 33, further comprising the step of generating the external clock signal used when the second stage demultiplexing integrated circuit operates in slave mode with the first stage demultiplexing integrated circuit.

39. The method of claim 33, wherein the input signal has a bit rate between about 40 to about 50 Gigahertz.

40. The method of claim 33, wherein the first bit rate has a data rate between about 10 to about 12.5 Gigahertz.

41. The method of claim 33, wherein the second bit rate has a data rate between about 2.5 to about 3.125 Gigahertz.

42. The method of claim 33, wherein the second stage demultiplexing integrated circuit comprises a clock circuit having a phase locked loop (PLL) that further comprises:

a first reference clock input coupled to receive the external clock signal generated by the first stage demultiplexing integrated circuit;

a second input coupled to receive a second reference clock generated by the second stage demultiplexing integrated circuit; and a first output producing a PLL Data Clock, wherein the PLL generates the PLL Data Clock based on one of the first and second reference clocks inputs based on the state of a select input to the second stage demultiplexing integrated circuit.

43. The method of claim 42, further comprising the step of providing a Receive Data Clock with which the second stage demultiplexing integrated circuit latches data of the received first plurality of bit streams, from the PLL Data Clock, when a master/slave mode select input is forced to a first binary state.

44. The method of claim 42 further comprising the step of generating a Receive Data Clock based on the second reference clock input when the second stage demultiplexing integrated circuit receives a loss of signal indication from the first stage demultiplexing integrated circuit.

45. The method of claim 42 further comprising the steps of:
monitoring frequency deviation between the first reference clock and the second reference clock; and
producing a phase adjustment signal to the first stage demultiplexing integrated circuit to compensate for frequency deviation exceeding a predetermined amount.

46. The method of claim 42 further comprising the step of providing a loss of signal output from the first stage demultiplexing integrated circuit to the second stage demultiplexing integrated circuit to indicate that the input signal has stopped.

47. The method of claim 42 wherein the external clock signal generated by the first stage data demultiplexing integrated circuit is based on a clock recovered from the input signal.

48. The method of claim 42 further comprising the step of bypassing the PLL Data Clock in favor of a received data clock based on the external clock signal with which the second stage demultiplexing integrated circuit latches data of the first plurality of bit streams when a master/slave mode select input forces the second stage demultiplexing integrated circuit to operate in a slave mode.

49. A downstream demultiplexing integrated circuit within a multi-stage bit stream demultiplexer that operates in a switchable master slave relationship with an upstream demultiplexing integrated circuit, comprising:
a plurality of input ports operable to receive a plurality of first bit streams at a first bit rate from the upstream demultiplexing integrated circuit;
a plurality of output ports that output a plurality of second bit streams at a second bit rate, wherein the plurality of second bit streams are greater in number than the plurality of first bit streams, and wherein the first bit rate is greater than the second bit rate; and
a clock circuit, that generates a clock signal for the upstream demultiplexing integrated circuit based upon a reference clock signal when the downstream demultiplexing integrated circuit operates in a master mode, and wherein the clock circuit generates the clock signal based upon an external clock signal received from the upstream demultiplexing integrated circuit when the second demultiplexing integrated circuit operates in a slave mode.

50. The downstream demultiplexing integrated circuit of claim 49, wherein the plurality of first bit streams comprise 4 bit streams and the plurality of second bit streams comprise 16 bit streams.

51. The downstream demultiplexing integrated circuit of claim 49, further comprising an input selector operable to direct the downstream demultiplexing integrated circuit to operate in either a master or slave mode with respect to the upstream demultiplexing integrated circuit.

52. The downstream demultiplexing integrated circuit of claim 49, wherein the clock circuit comprises:
a phased locked loop (PLL); and
a clock selection input having an output coupled to the PLL, a first input coupled to receive the reference clock signal, and a second input coupled to receive the external clock signal.

53. The downstream demultiplexing integrated circuit of claim 49, wherein the upstream demultiplexing integrated circuit operates with an internal clock speed higher than an internal clock speed of the downstream demultiplexing integrated circuit.

54. The downstream demultiplexing integrated circuit of claim 49, wherein the upstream demultiplexing integrated circuit comprises integrated circuits formed on a first substrate selected from the group consisting of InP, SiGe, GaN, GaAs, and Si and wherein the downstream demultiplexing integrated circuit comprises integrated circuits formed on a Si substrate.

55. The downstream demultiplexing integrated circuit of claim 49, wherein the external clock signal used when the downstream demultiplexing integrated circuit operates in slave mode is generated by a crystal oscillator.

56. The downstream demultiplexing integrated circuit of claim 49, wherein the input signal has a data rate between about 40 to about 50 Gigahertz, the first bit rate has a data rate between about 10 to about 12.5 Gigahertz, and the second bit rate has a data rate between about 2.5 to about 3.125 Gigahertz.

57. The downstream demultiplexing integrated circuit of claim 49, wherein the clock circuit comprises a phase locked loop (PLL) that further comprises:
a first reference clock input coupled to receive the external clock signal generated by the upstream demultiplexing integrated circuit;
a second reference clock input coupled to receive the reference clock signal; and
a first output producing a PLL Data Clock, wherein the PLL generates the PLL Data Clock based on one of the first and second reference clock inputs based on the state of a select input to the downstream demultiplexing integrated circuit.

58. The downstream demultiplexing integrated circuit of claim 57, wherein the PLL Data Clock provides a Receive Data Clock with which the downstream demultiplexing integrated circuit latches data of the received first plurality of bit streams when a master/slave mode select input is forced to a first binary state.

59. The downstream demultiplexing integrated circuit of claim 58, further comprising a loss of signal indication output from the upstream demultiplexing integrated circuit and input to the downstream demultiplexing integrated circuit to indicate that the input signal has stopped.

60. The downstream demultiplexing integrated circuit of claim 57, wherein the PLL generates the Receive Data Clock based on the second reference clock input when the downstream demultiplexing integrated circuit receives a loss of signal indication from the upstream demultiplexing integrated circuit.

61. The downstream demultiplexing integrated circuit of claim 57, wherein the PLL monitors frequency deviation between the first reference clock input and the second reference clock input, and the PLL produces a phase adjustment signal to the upstream demultiplexing integrated circuit to compensate for frequency deviation exceeding a predetermined amount.

62. The downstream demultiplexing integrated circuit of claim 57, wherein the PLL Data Clock is bypassed to provide a Receive Data Clock based on the external clock signal with which the downstream demultiplexing integrated circuit latches data of the first plurality of bit streams when a master/slave mode select input forces the downstream demultiplexing integrated circuit to operate in a slave mode.

63. The downstream demultiplexing integrated circuit of claim 49, wherein the external clock signal is based on a clock recovered from the input signal.

* * * * *